(12) United States Patent
Otomo et al.

(10) Patent No.: US 10,139,590 B2
(45) Date of Patent: Nov. 27, 2018

(54) IMAGING LENS AND IMAGING APPARATUS

(71) Applicant: FUJIFILM Corporation, Tokyo (JP)

(72) Inventors: Ryoko Otomo, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/712,235

(22) Filed: Sep. 22, 2017

(65) Prior Publication Data

US 2018/0088301 A1 Mar. 29, 2018

(30) Foreign Application Priority Data

Sep. 23, 2016 (JP) .................................. 2016-185169

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC .............................. G02B 9/62; G02B 13/0045
USPC .................................................. 359/708, 713
See application file for complete search history.

(56) References Cited

U.S. PATENT DOCUMENTS

| 9,383,552 B2 | 7/2016 | Liao | |
| 2005/0280900 A1* | 12/2005 | Toyama | G02B 13/04 359/680 |
| 2014/0368931 A1 | 12/2014 | Noda et al. | |
| 2016/0147044 A1* | 5/2016 | Kondo | G02B 13/0045 359/761 |

FOREIGN PATENT DOCUMENTS

| CN | 105204143 A | 12/2015 |
| JP | 2014-240918 A | 12/2014 |
| JP | 2016-065954 A | 4/2016 |

* cited by examiner

*Primary Examiner* — James Greece
(74) *Attorney, Agent, or Firm* — Studebaker & Brackett PC

(57) ABSTRACT

Provided are an imaging lens, which has a small F number and in which various aberrations are satisfactorily corrected, and an imaging apparatus including the imaging lens.
The imaging lens includes, in order from an object side: a first lens that has a biconcave shape; a second lens that is convex toward an image side and has a positive refractive power; a third lens that has a biconvex shape; a fourth lens that has a negative refractive power; a fifth lens that has a positive refractive power; and a sixth lens that has a negative refractive power. Assuming that L1f and L1r are paraxial radii of curvature of an object side surface and an image side surface of the first lens, Conditional Expression (1) is satisfied.

$$0.1 < (L1f + L1r)/(L1f - L1r) < 0.8 \quad (1)$$

20 Claims, 15 Drawing Sheets

EXAMPLE 1

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

IMAGING LENS AND IMAGING APPARATUS

CROSS-REFERENCE TO RELATED APPLICATIONS

The present application claims priority under 35 U.S.C. § 119 to Japanese Patent Application No. 2016-185169, filed on Sep. 23, 2016, all of which are hereby expressly incorporated by reference into the present application.

BACKGROUND OF THE INVENTION

1. Field of the Invention

The present invention relates to an imaging lens and an imaging apparatus. More specifically, the present invention relates to an imaging lens suitable for an on-vehicle camera, a surveillance camera, an industrial camera, a digital camera, and the like, and an imaging apparatus comprising the imaging lens.

2. Description of the Related Art

In electronic cameras such as on-vehicle cameras, surveillance cameras, and industrial cameras for factory automation (FA), machine vision (MV), and the like, the number of pixels in an imaging element has increased. In accordance with the increase, there has been a demand for an imaging lens in which various aberrations are satisfactorily corrected. Further, for a graphic operation such as imaging in the dark and blurring of the background, there also has been a demand for an imaging lens with a small F number.

As imaging lenses used in the above-mentioned electronic camera, JP2016-65954A, JP2014-240918A, U.S. Pat. No. 9,316,814B, and CN105204143A disclose imaging lenses configured such that six lenses of negative, positive, positive, negative, positive, negative lenses are arranged in order from the object side.

SUMMARY OF THE INVENTION

However, the imaging lenses described in JP2016-65954A, JP2014-240918A, U.S. Pat. No. 9,316,814B, and CN105204143A are not sufficient in terms of a small F number and correction of various aberrations, and thus there has been a demand for a higher performance imaging lens.

The present invention has been made in consideration of the above-mentioned situation, and its object is to provide an imaging lens, which has a small F number and in which various aberrations are satisfactorily corrected, and an imaging apparatus comprising this imaging lens.

An imaging lens of the present invention comprises, in order from an object side: a first lens that has a biconcave shape; a second lens that is convex toward an image side and has a positive refractive power; a third lens that has a biconvex shape; a fourth lens that has a negative refractive power; a fifth lens that has a positive refractive power; and a sixth lens that has a negative refractive power.

The following conditional expression is satisfied.

$$0.1 < (L1f + L1r)/(L1f - L1r) < 0.8 \tag{1}$$

Here, L1f is a paraxial radius of curvature of an object side surface of the first lens, and L1r is a paraxial radius of curvature of an image side surface of the first lens.

It is preferable that the imaging lens according to the present invention satisfies the following conditional expression.

$$0.55 < THsum/LL < 0.9 \tag{2}$$

Here, THsum is a sum of center thicknesses of the lenses of the whole system, and LL is a distance on an optical axis from the object side surface of the first lens to an image side surface of the sixth lens.

It is preferable that the imaging lens satisfies the following conditional expression.

$$0.1 < f3/f2 < 0.8 \tag{3}$$

Here, f2 is a focal length of the second lens, and f3 is a focal length of the third lens.

It is preferable that the imaging lens satisfies the following conditional expression.

$$-0.2 < (L3f + L3r)/(L3f - L3r) < 0.1 \tag{4}$$

Here, L3f is a paraxial radius of curvature of an object side surface of the third lens, and L3r is a paraxial radius of curvature of an image side surface of the third lens.

It is preferable that the imaging lens satisfies the following conditional expression.

$$-20 < L2r/L2f < 0.5 \tag{5}$$

Here, L2f is a paraxial radius of curvature of an object side surface of the second lens, and L2r is a paraxial radius of curvature of an image side surface of the second lens.

It is preferable that the imaging lens satisfies the following conditional expression.

$$-2 < f/f1 < -0.6 \tag{6}$$

Here, f is a focal length of the whole system, and f1 is a focal length of the first lens.

It is preferable that the imaging lens satisfies the following conditional expression.

$$2 < TTL/f < 5 \tag{7}$$

Here, TTL is a distance on the optical axis from the object side surface of the first lens to a focal point on the image side in a case where a back focal length is set as an air conversion length, and f is a focal length of the whole system.

It is preferable that the imaging lens satisfies the following conditional expression.

$$1.5 < LL/f < 4 \tag{8}$$

Here, LL is a distance on the optical axis from the object side surface of the first lens to the image side surface of the sixth lens, and f is a focal length of the whole system.

In the imaging lens according to the present invention, it is preferable that a material of a plurality of lenses among the first to sixth lenses is resin.

It is preferable that the imaging lens satisfies the following conditional expression.

$$-0.2 < f \times \Sigma \Phi p < 0.35 \tag{9}$$

Here, f is a focal length of the whole system, and $\Sigma \Phi p$ is a sum of refractive powers as an inverse of a focal length of all the lenses of which materials are resin.

In the imaging lens according to the present invention, it is preferable that an aperture stop is disposed between the image side surface of the second lens and the image side surface of the third lens.

It is preferable that the imaging lens according to the present invention satisfies any one of Conditional Expressions (1-1) to (9-1) in respective ranges of Expressions (1) to (9). In addition, the imaging lens of the present invention may satisfy any one of Conditional Expressions (1) to (9-1), or may satisfy an arbitrary combination thereof.

$$0.2<(L1f+L1r)/(L1f-L1r)<0.65 \quad (1\text{-}1)$$

$$0.6<THsum/LL<0.85 \quad (2\text{-}1)$$

$$0.2<f3/f2<0.65 \quad (3\text{-}1)$$

$$-0.17<(L3f+L3r)/(L3f-L3r)<0.05 \quad (4\text{-}1)$$

$$-10<L2r/L2f<0.1 \quad (5\text{-}1)$$

$$-1.5<f/f1<-0.7 \quad (6\text{-}1)$$

$$2.5<TTL/f<4.5 \quad (7\text{-}1)$$

$$2<LL/f<3.5 \quad (8\text{-}1)$$

$$-0.15<f\times\Sigma\Phi p<0.3 \quad (9\text{-}1)$$

An imaging apparatus of the present invention comprises the imaging lens of the present invention.

The term "comprises . . . " means that the lens may include not only the lenses as elements but also lenses substantially having no powers, optical elements, which are not lenses, such as a stop, a mask, a cover glass, and a filter, and mechanism parts such as a lens flange, a lens barrel, an imaging element, and a hand shaking correction mechanism.

Reference signs of refractive powers of the lenses, surface shapes of the lenses, and radii of curvature of surfaces of the lenses are assumed as those in paraxial regions in a case where some lenses have aspheric surfaces. Reference signs of radii of curvature of surface shapes convex toward the object side are set to be positive, and reference signs of radii of curvature of surface shapes convex toward the image side are set to be negative. Further, in the present invention, the conditional expressions relate to the d line (a wavelength of 587.6 nm) unless otherwise specified.

According to the imaging lens of the present invention, in the lens system using six lenses, power arrangement is appropriately set in the whole system such that Conditional Expression (1) is satisfied. Thus, it is possible to achieve an imaging lens that has a small F number and is capable of obtaining favorable optical performance.

The imaging apparatus according to the present invention comprises the imaging lens of the present invention. Thus, it is possible to satisfactorily perform imaging under a low illuminance condition, and it is possible to obtain excellent images with high resolutions in which various aberrations are corrected.

DESCRIPTION OF THE PREFERRED EMBODIMENTS

Figure 1:
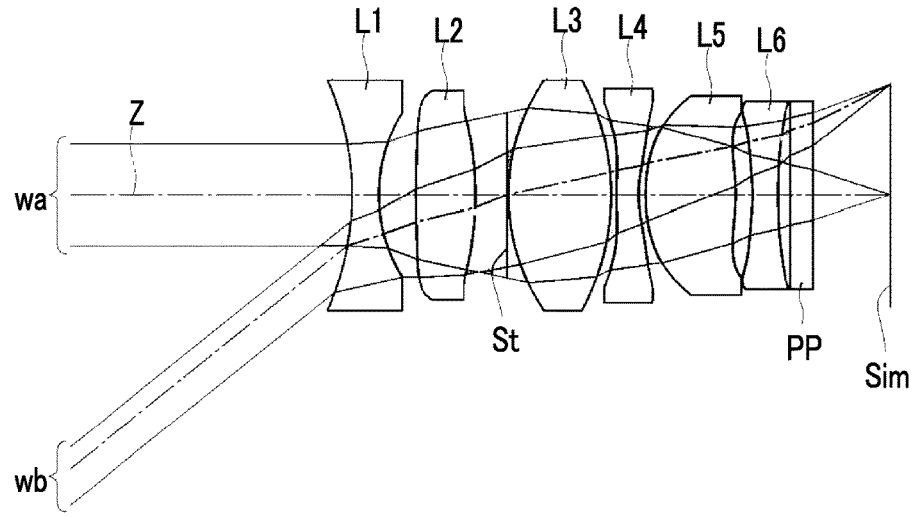
FIG. 1 is a diagram illustrating a configuration and optical paths of an imaging lens (common to Example 1) according to an embodiment of the present invention.

Hereinafter, embodiments of the present invention will be described with reference to drawings. FIG. 1 is a cross-sectional view illustrating a configuration of an imaging lens (common to Example 1) according to an embodiment of the present invention. The exemplary configuration shown in FIG. 1 is the same as the configuration of the imaging lens of Example 1 to be described later. In FIG. 1, the left side is an object side, and the right side is an image side. In addition, an aperture stop St shown in the drawing does not necessarily show its real size and shape, but show a position on an optical axis Z. Further, on-axis rays wa and rays with a maximum angle of view wb are also shown together.

As shown in FIG. 1, the imaging lens of the present embodiment comprises, in order from an object side: a first lens L1 that has a biconcave shape; a second lens L2 that is convex toward an image side and has a positive refractive power; a third lens L3 that has a biconvex shape; a fourth lens L4 that has a negative refractive power; a fifth lens L5 that has a positive refractive power; and a sixth lens L6 that has a negative refractive power. In addition, the aperture stop St is disposed between the second lens L2 and the third lens L3.

In a case where the imaging lens of the present embodiment is intended to be applied to an imaging apparatus, in accordance with a configuration of a camera on which the lens is mounted, it is preferable that a cover glass, a prism, and various filters such as an infrared cut filter and a lowpass filter are disposed between the optical system and the image plane Sim. Thus, FIG. 1 shows an example in which an optical member PP of a plane-parallel plate assumed as the above-mentioned elements is disposed between the lens system and the image plane Sim.

The imaging lens of the present embodiment is configured to satisfy Conditional Expression (1).

$$0.1<(L1f+L1r)/(L1f-L1r)<0.8 \quad (1)$$

Here, L1f is a paraxial radius of curvature of an object side surface of the first lens L1, and L1r is a paraxial radius of curvature of an image side surface of the first lens L1.

In the imaging lens of the present embodiment, by making the first lens L1 have a biconcave shape, the first lens L1 is formed as a negative lens. Thus it is possible to achieve a wide angle, and it is possible to minimize an incident angle of rays which are incident at a peripheral angle of view onto the image plane. Further, by making the first lens L1 have a biconcave shape, the negative refractive power is shared by two surfaces. Thus, it is possible to suppress occurrence of spherical aberration.

By making the second lens L2 convex toward an image side and have a positive refractive power. Thereby, on-axis marginal rays, which are diverged through the first lens L1, are directed to be converged earlier. Hence, by shortening a total length of the lens system, it is possible to decrease a diameter of the lens system, and it is possible to satisfactorily correct spherical aberration. Here, in a case where the second lens L2 is a meniscus lens or a plano-convex lens that is convex toward the object side, if a refractive power thereof in a manner similar to a case where the lens is convex toward the image side is intended to be provided, a load of an object side surface, at which the incident angle of the on-axis marginal rays diverged through the first lens L1 and incident onto the lens surface becomes larger, becomes heavier, and thus spherical aberration occurs. In the present embodiment, the second lens L2 is convex toward the image side. Thus, it is possible to gently converge on-axis marginal rays which are diverged through the first lens L1. Thereby, it is possible to suppress occurrence of spherical aberration.

By making the third lens L3 have a biconvex shape, the second lens L2 and the third lens L3 share a positive refractive power. Thus, it is possible to suppress occurrence of spherical aberration. Further, since the positive refractive power is shared by both surfaces of the lens, it is possible to more satisfactorily suppress occurrence of spherical aberration.

By making the fourth lens L4 have a negative refractive power, it is possible to satisfactorily correct longitudinal chromatic aberration and spherical aberration. In particular, the fourth lens L4 is disposed immediately after the third lens L3. Thus, on-axis marginal rays are incident onto the fourth lens L4 at a high position. However, by making the fourth lens L4 have a negative refractive power, it is possible to further enhance the effect of correcting longitudinal chromatic aberration and spherical aberration.

By making the fifth lens L5 have a positive refractive power, the second lens L2 and the third lens L3 share the positive refractive power. Thus, it is possible to suppress occurrence of spherical aberration.

By making the sixth lens L6 have a negative refractive power, it is possible to make a principal point position close to the object side. Thus, it is possible to shorten the total length of the lens system, and it is possible to correct field curvature and distortion.

By not allowing the result of Conditional Expression (1) to be equal to or less than the lower limit, it is possible to suppress occurrence of astigmatism and distortion. By not allowing the result of Conditional Expression (1) to be equal to or greater than the upper limit, it is possible to suppress occurrence of spherical aberration.

In order to more enhance the effect of Conditional Expression (1), it is more preferable that Conditional Expression (1-1) is satisfied.

$$0.2<(L1f+L1r)/(L1f-L1r)<0.65 \quad (1-1)$$

It is preferable that the imaging lens of the present embodiment satisfies Conditional Expression (2).

$$0.55<THsum/LL<0.9 \quad (2)$$

Here, THsum is a sum of center thicknesses of the lenses of the whole system, and LL is a distance on the optical axis from the object side surface of the first lens L1 to the image side surface of the sixth lens L6.

By not allowing the result of Conditional Expression (2) to be equal to or less than the lower limit, it is possible to prevent air lenses formed between the lenses from having excessive effects. Thus, for example, it is possible to suppress occurrence of high-order, that is, fifth or more order spherical aberration. By not allowing the result of Conditional Expression (2) to be equal to or greater than the upper limit, through the effects of the air lenses, it is possible to satisfactorily correct low-order spherical aberration.

In order to more enhance the effect of Conditional Expression (2), it is more preferable that Conditional Expression (2-1) is satisfied.

$$0.6<THsum/LL<0.85 \quad (2-1)$$

It is preferable that the imaging lens of the present embodiment satisfies Conditional Expression (3).

$$0.1<f3/f2<0.8 \quad (3)$$

Here, f2 is a focal length of the second lens L2, and
f3 is a focal length of the third lens L3.

By not allowing the result of Conditional Expression (3) to be equal to or less than the lower limit, it is possible to suppress occurrence of spherical aberration in the third lens L3, and it is possible to satisfactorily correct distortion. By not allowing the result of Conditional Expression (3) to be equal to or greater than the upper limit, it is possible to make the second lens L2 and the third lens L3 share the deflection effect without rapidly deflecting divergent rays, which are emitted from the first lens L1, toward the second lens L2. Thus, in the second lens L2, it is possible to suppress occurrence of spherical aberration. Further, it is possible to ensure a back focal length.

In order to more enhance the effect of Conditional Expression (3), it is more preferable that Conditional Expression (3-1) is satisfied.

$$0.2<f3/f2<0.65 \quad (3-1)$$

It is preferable that the imaging lens of the present embodiment satisfies Conditional Expression (4).

$$-0.2<(L3f+L3r)/(L3f-L3r)<0.1 \quad (4)$$

Here, L3f is a paraxial radius of curvature of an object side surface of the third lens L3, and L3r is a paraxial radius of curvature of an image side surface of the third lens L3.

By satisfying Conditional Expression (4), it is possible to make the object side surface and the image side surface of the third lens L3 appropriately share a refractive power thereof. Thus, it is possible to suppress occurrence of spherical aberration.

In order to more enhance the effect of Conditional Expression (4), it is more preferable that Conditional Expression (4-1) is satisfied.

$$-0.17<(L3f+L3r)/(L3f-L3r)<0.05 \qquad (4\text{-}1)$$

It is preferable that the imaging lens of the present embodiment satisfies Conditional Expression (5).

$$-20<L2r/L2f<0.5 \qquad (5)$$

Here, L2f is a paraxial radius of curvature of an object side surface of the second lens L2, and L2r is a paraxial radius of curvature of an image side surface of the second lens L2.

By satisfying Conditional Expression (5), it is possible to make the object side surface and the image side surface of the second lens L2 appropriately share the effect of deflecting rays. Thus, it is possible to suppress occurrence of spherical aberration.

In order to more enhance the effect of Conditional Expression (5), it is more preferable that Conditional Expression (5-1) is satisfied.

$$-10<L2r/L2f<0.1 \qquad (5\text{-}1)$$

It is preferable that the imaging lens of the present embodiment satisfies Conditional Expression (6).

$$-2<f/f1<-0.6 \qquad (6)$$

Here, f is a focal length of the whole system, and f1 is a focal length of the first lens L1.

By not allowing the result of Conditional Expression (6) to be equal to or less than the lower limit, it is possible to suppress occurrence of spherical aberration. Further, it is possible to suppress the total length of the lens system. By not allowing the result of Conditional Expression (6) to be equal to or greater than the upper limit, it is possible to decrease a diameter of the first lens L1. Thus, it is possible to achieve a wide angle, and it is possible to ensure a back focal length.

In order to more enhance the effect of Conditional Expression (6), it is more preferable that Conditional Expression (6-1) is satisfied.

$$-1.5<f/f1<-0.7 \qquad (6\text{-}1)$$

It is preferable that the imaging lens of the present embodiment satisfies Conditional Expression (7).

$$2<TTL/f<5 \qquad (7)$$

Here, TTL is a distance on the optical axis from the object side surface of the first lens L1 to a focal point on the image side in a case where a back focal length is set as an air conversion length, and f is a focal length of the whole system.

By not allowing the result of Conditional Expression (7) to be equal to or less than the lower limit, it is possible to satisfactorily correct spherical aberration and field curvature. By not allowing the result of Conditional Expression (7) to be equal to or greater than the upper limit, it is possible to suppress the total length of the lens system.

In order to more enhance the effect of Conditional Expression (7), it is more preferable that Conditional Expression (7-1) is satisfied.

$$2.5<TTL/f<4.5 \qquad (7\text{-}1)$$

It is preferable that the imaging lens of the present embodiment satisfies Conditional Expression (8).

$$1.5<LL/f<4 \qquad (8)$$

Here, LL is a distance on the optical axis from the object side surface of the first lens L1 to the image side surface of the sixth lens L6, and f is a focal length of the whole system.

By not allowing the result of Conditional Expression (8) to be equal to or less than the lower limit, it is possible to satisfactorily correct spherical aberration and field curvature. By not allowing the result of Conditional Expression (8) to be equal to or greater than the upper limit, it is possible to suppress the total length of the lens system.

In order to more enhance the effect of Conditional Expression (8), it is more preferable that Conditional Expression (8-1) is satisfied.

$$2<LL/f<3.5 \qquad (8\text{-}1)$$

In the imaging lens of the present embodiment, it is preferable that a material of a plurality of lenses among the first to sixth lenses L1 to L6 is resin.

By using resin as the material of the plurality of lenses among the first to sixth lenses L1 to L6, it is possible to accurately form an aspheric shape of the lens, and it is possible to achieve reduction in weight and costs. In addition, in the present embodiment, materials of the second lens L2, the fourth lens L4, the fifth lens L5, and the sixth lens L6 are resin.

In a case where the materials of the plurality of lenses among the first to sixth lenses L1 to L6 are resin, it is preferable that the imaging lens of the present embodiment satisfies Conditional Expression (9).

$$-0.2<f\times\Sigma\Phi p<0.35 \qquad (9)$$

Here, f is a focal length of the whole system $\Sigma\Phi p$ is a sum of refractive powers as an inverse of a focal length of all the lenses of which materials are resin.

Here, in a case where Conditional Expression (9) has a negative value, the focal point of the lens system moves in a direction to promote expansion of the barrel, which holds the imaging lens of the present embodiment, caused by a temperature. By not allowing the result of Conditional Expression (9) to be equal to or less than the lower limit, it is possible to prevent the focal point from moving in the direction to promote the expansion of the barrel caused by change in temperature. Thus, it is possible to prevent performance from deteriorating due to change in temperature characteristics of the lens system. In contrast, in a case where Conditional Expression (9) has a positive value, the focal point moves in a direction to cancel the expansion of the barrel caused by the change in temperature. Thus, it is possible to suppress fluctuation in temperature characteristics of the lens system caused by the change in temperature. By not allowing the result of Conditional Expression (9) to be equal to or greater than the upper limit, it is possible to prevent fluctuation in temperature characteristics of the lens system from being excessively corrected.

In order to more enhance the effect of Conditional Expression (9), it is more preferable that Conditional Expression (9-1) is satisfied.

$$-0.15\leq f\times\Sigma\Phi p<0.3 \qquad (9\text{-}1)$$

In the imaging lens of the present embodiment, it is preferable that an aperture stop St is disposed between the image side surface of the second lens L2 and the image side surface of the third lens L3. Thereby, it is possible to minimize the height of the incidence rays, and it is possible to achieve reduction in size of the lens system in the diameter direction.

It is preferable that the imaging lens of the present embodiment satisfies Conditional Expression (10).

$$0.15<f/f2<0.7 \quad (10)$$

Here, f is a focal length of the whole system, and
f2 is a focal length of the second lens L2.

By not allowing the result of Conditional Expression (10) to be equal to or less than the lower limit, it is possible to satisfactorily correct distortion. By not allowing the result of Conditional Expression (10) to be equal to or greater than the upper limit, it is possible to suppress occurrence of spherical aberration in the second lens L2.

In order to more enhance the effect of Conditional Expression (10), it is more preferable that Conditional Expression (10-1) is satisfied.

$$0.25<f/f2<0.6 \quad (10\text{-}1)$$

It is preferable that the imaging lens of the present embodiment satisfies Conditional Expression (11).

$$0.5<f/f3<1.5 \quad (11)$$

Here, f is a focal length of the whole system, and
f3 is a focal length of the third lens L3.

By not allowing the result of Conditional Expression (11) to be equal to or less than the lower limit, the positive refractive power of the whole optical system can be shared by the third lens L3. Thus, it is possible to suppress occurrence of spherical aberration. By not allowing the result of Conditional Expression (11) to be equal to or greater than the upper limit, it is possible to suppress occurrence of spherical aberration in the third lens L3.

In order to more enhance the effect of Conditional Expression (11), it is more preferable that Conditional Expression (11-1) is satisfied.

$$0.6<f/f3<1.2 \quad (11\text{-}1)$$

It is preferable that the imaging lens of the present embodiment satisfies Conditional Expression (12).

$$-1.2<f/f4<-0.2 \quad (12)$$

Here, f is a focal length of the whole system, and
f4 is a focal length of the fourth lens L4.

By not allowing the result of Conditional Expression (12) to be equal to or less than the lower limit, it is possible to suppress occurrence of high-order spherical aberration. By not allowing the result of Conditional Expression (12) to be equal to or greater than the upper limit, it is possible to satisfactorily correct longitudinal chromatic aberration and spherical aberration.

In order to more enhance the effect of Conditional Expression (12), it is more preferable that Conditional Expression (12-1) is satisfied.

$$-1<f/f4<-0.35 \quad (12\text{-}1)$$

It is preferable that the imaging lens of the present embodiment satisfies Conditional Expression (13).

$$0.5<f/f5<1.5 \quad (13)$$

Here, f is a focal length of the whole system, and
f5 is a focal length of the fifth lens L5.

By not allowing the result of Conditional Expression (13) to be equal to or less than the lower limit, the positive refractive power of the whole optical system can be shared by the fifth lens L5. Thus, it is possible to suppress occurrence of spherical aberration. By not allowing the result of Conditional Expression (13) to be equal to or greater than the upper limit, it is possible to suppress occurrence of spherical aberration in the fifth lens L5.

In order to more enhance the effect of Conditional Expression (13), it is more preferable that Conditional Expression (13-1) is satisfied.

$$0.6<f/f5<1.2 \quad (13\text{-}1)$$

It is preferable that the imaging lens of the present embodiment satisfies Conditional Expression (14).

$$-1<f/f6<-0.05 \quad (14)$$

Here, f is a focal length of the whole system, and
f6 is a focal length of the sixth lens L6.

By not allowing the result of Conditional Expression (14) to be equal to or less than the lower limit, it is possible to minimize an incident angle of off-axis principal rays incident onto the image plane. By not allowing the result of Conditional Expression (14) to be equal to or greater than the upper limit, it is possible to minimize the total length of the lens system, and it is possible to satisfactorily correct distortion.

In order to more enhance the effect of Conditional Expression (14), it is more preferable that Conditional Expression (14-1) is satisfied.

$$-0.8<f/f6<-0.1 \quad (14\text{-}1)$$

In a case where the imaging lens of the present embodiment is used in severe environments such as an on-vehicle camera and a surveillance camera, there is a demand for the first lens L1 disposed to be closest to the object side to use a material which is resistant to surface deterioration caused by weather and rain and change in temperature caused by direct sunlight and is resistant to chemicals such as fats and oils, that is, a material which is excellent in terms of water resistance, weather resistance, acid resistance, chemical resistance, and the like. Further, there is a demand for the first lens L1 to use a material which is hard and hard to break. Hence, by using glass as the material of the first lens L1, it is possible to cope with the above-mentioned demands. In addition, as the material of the first lens L1, transparent ceramics may be used.

Protective means for enhancing strength, scratch resistance, and chemical resistance may be applied to the object side surface of the first lens L1. In such a case, the first lens L1 may be made of plastic. Such a protective means may be a hard coat or a water repellent coat.

In the example shown in FIG. 1, the optical member PP is disposed between the lens system and the image plane Sim. However, various filters such as a lowpass filter or a filter for cutting off a specific wavelength region may not be disposed between the lens system and the image plane Sim. Instead, such various filters may be disposed between the lenses, or coating for functions the same as those of various filters may be performed on a lens surface of any lens.

The above-mentioned preferred configurations and available configurations including the configurations relating to the conditional expressions may be arbitrary combinations, and it is preferable to selectively adopt the configurations in accordance with required specification. For example, the imaging lens according to the present embodiment satisfies Conditional Expression (1), but may satisfy any one of Conditional Expressions (1) to (14) and Conditional Expressions (1-1) to (14-1), and may satisfy an arbitrary combination of the conditional expressions.

Next, numerical examples of the imaging lens of the present invention will be described. First, an imaging lens of Example 1 will be described. FIG. 1 is a cross-sectional view illustrating a lens configuration and optical paths of the imaging lens of Example 1. In addition, in FIG. 1 and FIGS. 2 to 9 corresponding to Examples 2 to 9, the optical member PP is additionally shown. Further, the left side is an object side, and the right side is an image side. In addition, an aperture stop St shown in the drawing does not necessarily show its real size and shape, but show a position on an optical axis Z.

The imaging lens of Example 1 includes, in order from an object side: a first lens L1 that has a biconcave shape; a second lens L2 that is convex toward an image side and has a positive refractive power; a third lens L3 that has a biconvex shape; a fourth lens L4 that has a negative refractive power; a fifth lens L5 that has a positive refractive power; and a sixth lens L6 that has a negative refractive power. In addition, in the present embodiment, materials of the first lens L1 and the third lens L3 are glass, and materials of the second lens L2, the fourth lens L4, the fifth lens L5, and the sixth lens L6 are resin.

Table 1 shows basic lens data of the imaging lens of Example 1, Table 2 shows data about specification, and Table 3 shows aspheric coefficients thereof. Hereinafter, meanings of the reference signs in the tables are, for example, as described in Example 1, and are basically the same as those in Examples 2 to 9.

In the lens data of Table 1, the column of Si shows i-th (i=1, 2, 3, . . . ) surface number. The i-th surface number sequentially increases toward the image side in a case where a surface of an element closest to the object side is regarded as a first surface. The column of Ri shows a radius of curvature of the i-th surface. The column of Di shows a surface spacing on the optical axis Z between the i-th surface and an (i+1)th surface. Further, the column of Ndj shows a refractive index of a j-th (j=1, 2, 3, . . . ) optical element at the d line (a wavelength of 587.6 nm), where j sequentially increases toward the image side in a case where the optical element closest to the object side is regarded as the first element. The column of vdj shows an Abbe number of the j-th optical element on the basis of the d line (a wavelength of 587.6 nm).

It should be noted that the sign of the radius of curvature is positive in a case where a surface has a shape convex toward the object side, and is negative in a case where a surface has a shape convex toward the image side. The basic lens data additionally shows the aperture stop St and the optical member PP. In a place of a surface number of a surface corresponding to the aperture stop St, the surface number and a term of (stop) are noted.

In the data about the specification of Table 2, values of the focal length f, the back focal length Bf, the F number FNo., and the total angle of view 2ω of the whole system are noted.

In Table 1, the reference sign * is attached to surface numbers of aspheric surfaces, and numerical values of the paraxial radius of curvature are written into the column of the radius of curvature of the aspheric surface. Table 3 shows aspheric coefficients of the aspheric surfaces of Example 1. The "E±n" (n: an integer) in numerical values of the aspheric coefficients of Table 3 indicates "×10$^{\pm n}$". The aspheric coefficients are values of the coefficients KA and Am (m=3, 4, 5, . . . 16) in aspheric surface expression represented as the following expression.

$$Zd = \frac{C \times h^2}{1 + \sqrt{1 - KA \times C^2 \times h^2}} + \sum_{m} Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, and KA and Am are aspheric coefficients.

In data of each table, a degree is used as a unit of an angle, and mm is used as a unit of a length, but appropriate different units may be used since the optical system can be used even in a case where the system is enlarged or reduced in proportion. Further, the following each table describes numerical values rounded off to predetermined decimal places.

TABLE 1

EXAMPLE 1-LENS DATA

| Si | Ri | Di | Ndj | vdj |
|---|---|---|---|---|
| 1 | −10.96626 | 1.041 | 1.58913 | 61.13 |
| 2 | 6.04412 | 1.452 | | |
| *3 | 39.31445 | 2.303 | 1.53114 | 55.43 |
| *4 | −14.82695 | 1.249 | | |
| 5(STOP) | ∞ | 0.050 | | |
| 6 | 8.12612 | 3.986 | 1.75500 | 52.32 |
| 7 | −9.59351 | 0.213 | | |
| *8 | 13.45347 | 0.862 | 1.63350 | 23.62 |
| *9 | 4.49407 | 0.272 | | |
| *10 | 6.95694 | 3.535 | 1.53114 | 55.43 |
| *11 | −6.90337 | 0.653 | | |
| *12 | −7.61947 | 1.000 | 1.63350 | 23.62 |
| *13 | 64.00000 | 0.500 | | |
| 14 | ∞ | 0.900 | 1.51680 | 64.20 |
| 15 | ∞ | 3.018 | | |

TABLE 2

EXAMPLE 1-SPECIFICATION (d LINE)

| | |
|---|---|
| f | 6.357 |
| Bf | 4.111 |
| FNo. | 1.60 |
| 2ω [°] | 77.6 |

TABLE 3

EXAMPLE 1-ASPHERIC COEFFICIENT

| SURFACE NUMBER | 3 | 4 | 8 | 9 |
|---|---|---|---|---|
| KA | −1.3121862E+00 | −3.4886953E+00 | −4.7906717E+00 | 8.8953701E−01 |
| A3 | 0.0000000E+00 | 3.4019471E−18 | 7.5148512E−18 | −1.5361009E−17 |
| A4 | −4.4258557E−04 | −2.0934100E−03 | −1.2840622E−02 | −1.4034463E−02 |

TABLE 3-continued

EXAMPLE 1-ASPHERIC COEFFICIENT

| A5 | −1.9845611E−03 | 1.5756263E−03 | −2.7330482E−03 | −3.8747158E−03 |
|---|---|---|---|---|
| A6 | 2.3590298E−03 | −1.3989010E−03 | 1.9061964E−03 | 1.0581100E−03 |
| A7 | −8.4077086E−04 | 4.5961367E−04 | 2.3899366E−04 | 1.1441788E−03 |
| A8 | −2.8379594E−04 | 1.2210694E−04 | −1.2563519E−04 | −5.0726998E−05 |
| A9 | 2.6375152E−04 | −1.1026720E−04 | −1.0156591E−05 | −1.7529566E−04 |
| A10 | −1.7484872E−05 | 1.0181918E−05 | 2.7360630E−06 | 1.7461924E−05 |
| A11 | −2.5466482E−05 | 8.3910793E−06 | 6.3152907E−07 | 8.8682424E−06 |
| A12 | 4.4810552E−06 | −1.7670355E−06 | −2.2119539E−08 | −6.8825784E−07 |
| A13 | 1.0584876E−06 | −2.5951248E−07 | −2.1257166E−08 | −2.9054335E−07 |
| A14 | −2.5467682E−07 | 8.1113000E−08 | 1.3588309E−10 | 1.3351831E−08 |
| A15 | −1.6115682E−08 | 2.7348614E−09 | 2.8648940E−10 | 3.5769552E−09 |
| A16 | 4.7985712E−09 | −1.2360429E−09 | −7.2221727E−12 | 3.1245372E−11 |

| SURFACE NUMBER | 10 | 11 | 12 | 13 |
|---|---|---|---|---|
| KA | 1.2343740E+00 | −4.9849832E+00 | −3.3793212E+00 | 3.8790801E+00 |
| A3 | 5.6977853E−18 | −1.0561143E−17 | −8.0610909E−18 | 2.0888022E−16 |
| A4 | 4.6667347E−03 | 1.1764196E−02 | 1.1546156E−02 | 9.1058223E−03 |
| A5 | −6.3317864E−04 | 9.4776724E−04 | 7.7476464E−03 | −2.8814135E−03 |
| A6 | −2.7486415E−03 | −2.7589356E−03 | −8.8844533E−03 | 1.5175227E−03 |
| A7 | 1.3925749E−03 | 7.9001135E−04 | 7.3722187E−04 | −8.3714749E−04 |
| A8 | 2.9390443E−04 | 2.5670125E−04 | 1.4796068E−03 | −3.0163393E−04 |
| A9 | −2.6302044E−04 | −1.4739602E−04 | −4.1910423E−04 | 3.2079338E−04 |
| A10 | 5.8761963E−06 | −1.3817352E−05 | −9.8387083E−05 | −4.5769308E−05 |
| A11 | 1.7956070E−05 | 1.0413297E−05 | 4.7164227E−05 | −1.5926607E−05 |
| A12 | −1.5150828E−06 | 1.2273567E−06 | 1.4453880E−06 | 3.4187946E−06 |
| A13 | −6.0863415E−07 | −3.6660398E−07 | −2.1509924E−06 | 5.6421745E−07 |
| A14 | 7.2012132E−08 | −5.8212564E−08 | 1.1307183E−07 | −1.3667759E−07 |
| A15 | 7.5194384E−09 | 4.7732006E−09 | 3.5562844E−08 | −6.5987652E−09 |
| A16 | −1.0365750E−09 | 9.7897662E−10 | −3.6558908E−09 | 1.8087969E−09 |

Figure 10:
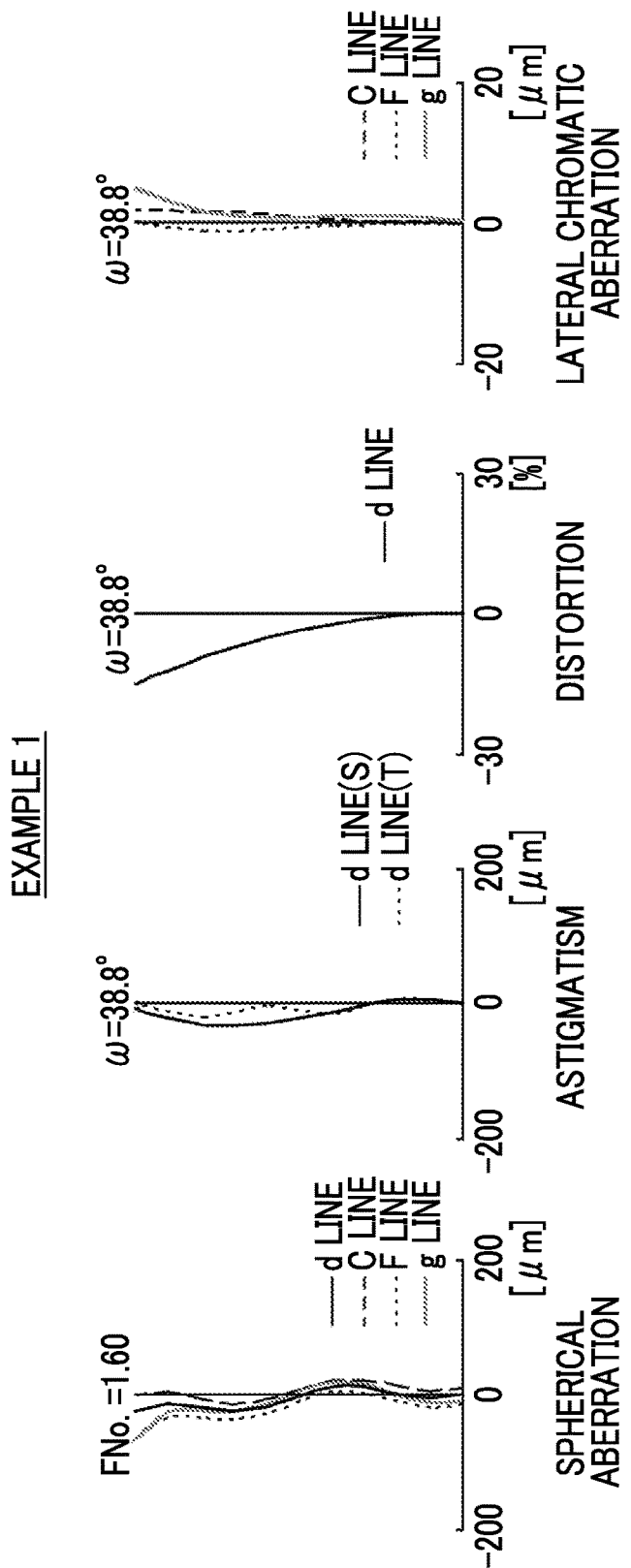
FIG. 10 is a diagram of aberrations of the imaging lens of Example 1 of the present invention.

FIG. 10 shows a diagram of aberrations of the imaging lens of Example 1. In addition, in order from the left side of FIG. 10, spherical aberration, astigmatism, distortion, and lateral chromatic aberration are shown. The diagram of aberrations illustrating spherical aberration, astigmatism, and distortion indicates aberrations that occur in a case where the d line (a wavelength of 587.6 nm) is set as a reference wavelength. In the spherical aberration diagram, aberrations at the d line (a wavelength of 587.6 nm), the C line (a wavelength of 656.3 nm), the F line (a wavelength of 486.1 nm), and the g line (a wavelength of 435.8 nm) are respectively indicated by the solid line, the long dashed line, the short dashed line, and the gray solid line. In the astigmatism diagram, aberrations in sagittal and tangential directions are respectively indicated by the solid line and the short dashed line. In the lateral chromatic aberration diagram, aberrations at the C line (a wavelength of 656.3 nm), the F line (a wavelength of 486.1 nm), and the g line (a wavelength of 435.8 nm) are respectively indicated by the long dashed line, the short dashed line, and the gray solid line. It should be noted that all the aberrations are aberrations in a case where an object at infinity is in focus. In the spherical aberration diagram, FNo. indicates an F number. In the other aberration diagrams, w indicates a half angle of view.

In the description of Example 1, reference signs, meanings, and description methods of the respective data pieces are the same as those in the following examples unless otherwise noted. Therefore, in the following description, repeated description will be omitted.

Figure 2:
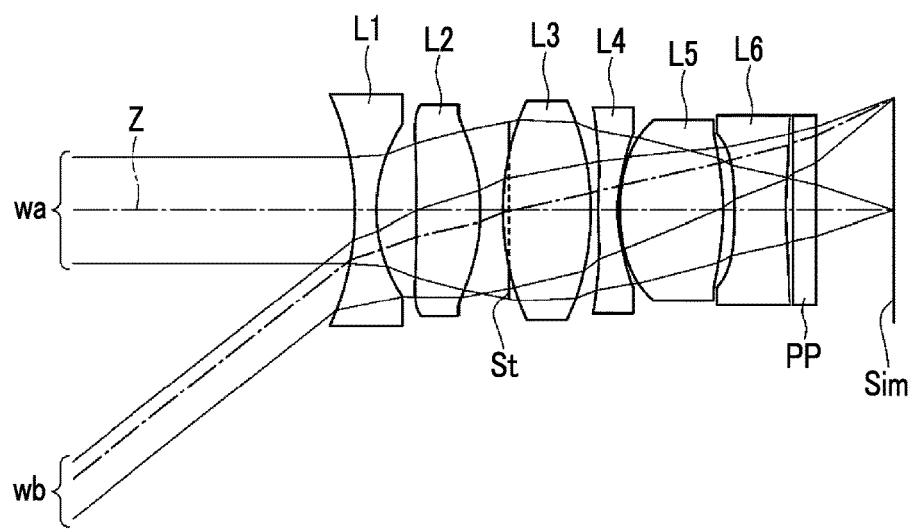
FIG. 2 is a cross-sectional view illustrating a configuration and optical paths of an imaging lens of Example 2 of the present invention.
Figure 11:
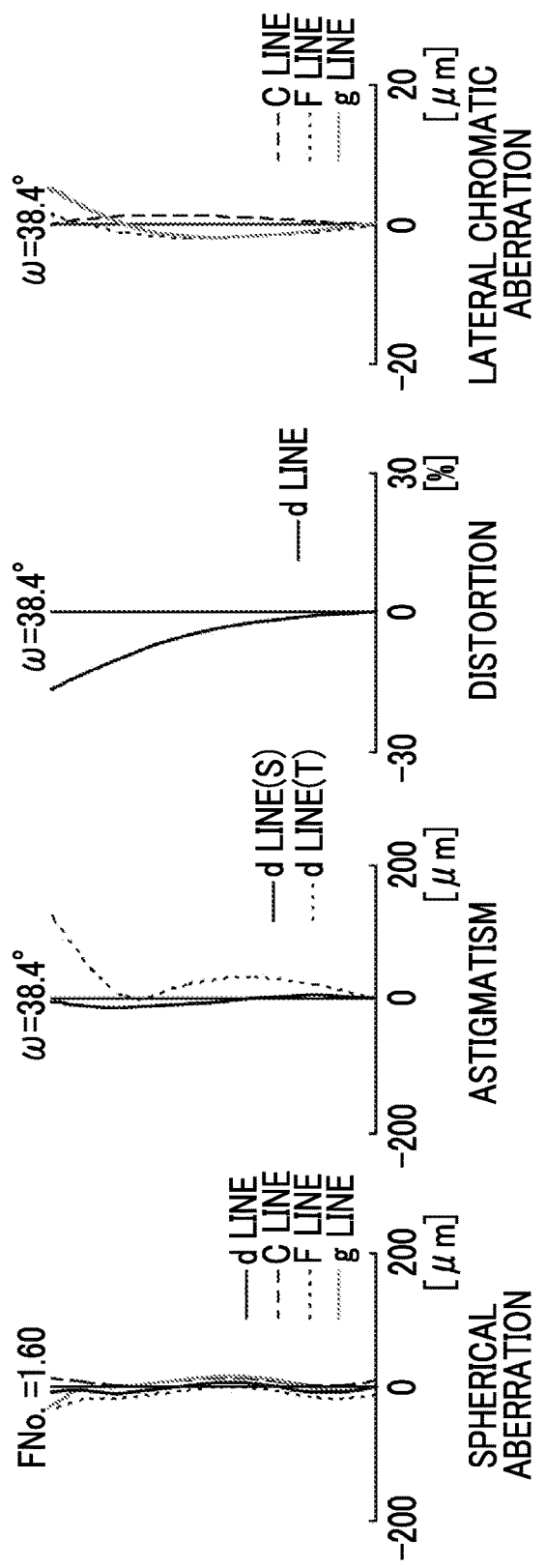
FIG. 11 is a diagram of aberrations of the imaging lens of Example 2 of the present invention.

Next, an imaging lens of Example 2 will be described. FIG. 2 is a cross-sectional view illustrating a configuration and optical paths of the imaging lens of Example 2. The imaging lens of Example 2 has the same lens configuration as that of Example 1. Table 4 shows lens data of the imaging lens of Example 2, Table 5 shows data about specification, and Table 6 shows aspheric coefficients. FIG. 11 shows a diagram of aberrations thereof

TABLE 4

EXAMPLE 2-LENS DATA

| Si | Ri | Di | Ndj | vdj |
|---|---|---|---|---|
| 1 | −10.87058 | 0.840 | 1.58913 | 61.13 |
| 2 | 6.06399 | 1.550 | | |
| *3 | ∞ | 2.484 | 1.53156 | 55.12 |
| *4 | −8.11080 | 1.111 | | |
| 5(STOP) | ∞ | −0.232 | | |
| 6 | 10.32025 | 3.417 | 1.75500 | 52.32 |
| 7 | −10.32023 | 0.280 | | |
| *8 | 13.31760 | 0.753 | 1.63360 | 23.61 |
| *9 | 4.57640 | 0.100 | | |
| *10 | 7.10608 | 4.037 | 1.53156 | 55.12 |
| *11 | −8.83097 | 0.446 | | |
| *12 | −15.94691 | 2.000 | 1.63360 | 23.61 |
| *13 | 19.05843 | 0.300 | | |
| 14 | ∞ | 0.900 | 1.51680 | 64.20 |
| 15 | ∞ | 3.019 | | |

TABLE 5

EXAMPLE 2-SPECIFICATION (d LINE)

| f | 6.582 |
|---|---|
| Bf | 3.912 |
| FNo. | 1.60 |
| 2ω[°] | 76.8 |

TABLE 6

EXAMPLE 2-ASPHERIC COEFFICIENT

| SURFACE NUMBER | 3 | 4 | 8 | 9 |
|---|---|---|---|---|
| KA | 1.0000000E+00 | −3.4978006E+00 | −4.7768349E+00 | 9.0980527E−01 |
| A3 | 0.0000000E+00 | 1.8645569E−18 | −3.4986119E−18 | 5.2138622E−17 |
| A4 | −8.3520549E−04 | −2.7977619E−03 | −1.0322633E−02 | −1.0592209E−02 |
| A5 | −1.5698433E−03 | 1.3841842E−03 | −1.5384476E−03 | −2.7026012E−03 |
| A6 | 1.5222118E−03 | −9.5468630E−04 | 1.8011334E−03 | 6.9116202E−04 |
| A7 | −4.1651966E−04 | 3.2817950E−04 | 8.4955728E−05 | 9.7201545E−04 |
| A8 | −1.6662525E−04 | 6.4291520E−05 | −1.4294059E−04 | −5.1488084E−05 |
| A9 | 1.1790947E−04 | −7.4566204E−05 | 7.6389451E−07 | −1.5500939E−04 |
| A10 | −4.9112962E−06 | 9.3356980E−06 | 5.0762253E−06 | 1.9966755E−05 |
| A11 | −9.5642771E−06 | 5.2356710E−06 | 2.1337984E−07 | 7.6889792E−06 |
| A12 | 1.4569379E−06 | −1.2244922E−06 | −1.3920351E−07 | −9.1736376E−07 |
| A13 | 3.3152150E−07 | −1.4838599E−07 | −1.2959285E−08 | −2.5055445E−07 |
| A14 | −7.1942896E−08 | 4.9539889E−08 | 2.8105455E−09 | 2.1354092E−08 |
| A15 | −4.2030381E−09 | 1.4253590E−09 | 2.1965619E−10 | 3.0451276E−09 |
| A16 | 1.1476037E−09 | −6.8029517E−10 | −3.0529027E−11 | −8.5305488E−11 |

| SURFACE NUMBER | 10 | 11 | 12 | 13 |
|---|---|---|---|---|
| KA | 1.3129546E+00 | −4.8456078E+00 | −3.4000692E+00 | −7.3051826E−01 |
| A3 | 1.8794657E−17 | 2.4643998E−17 | 0.0000000E+00 | 2.6530136E−16 |
| A4 | 3.9946016E−03 | 4.1432701E−03 | −2.0846435E−03 | 2.7409824E−04 |
| A5 | −7.2892168E−04 | 1.1768742E−03 | 3.6167462E−03 | −2.8428064E−03 |
| A6 | −2.2055431E−03 | −2.1924793E−03 | −3.6003465E−03 | 2.4218724E−03 |
| A7 | 1.1419096E−03 | 4.6029745E−04 | 5.0697266E−04 | −7.1922721E−04 |
| A8 | 1.9985700E−04 | 2.3782180E−04 | 4.8487858E−04 | −3.3064899E−04 |
| A9 | −1.9116405E−04 | −1.0016543E−04 | −2.1341143E−04 | 2.6229797E−04 |
| A10 | 6.4687744E−06 | −1.4446866E−05 | −1.3884075E−05 | −3.2861378E−05 |
| A11 | 1.1909862E−05 | 7.1811140E−06 | 2.0585538E−05 | −1.2381815E−05 |
| A12 | −1.0774623E−06 | 1.1384151E−06 | −1.2628637E−06 | 2.4713816E−06 |
| A13 | −3.6971697E−07 | −2.5217558E−07 | −8.0930820E−07 | 4.1472167E−07 |
| A14 | 4.4410282E−08 | −4.8213941E−08 | 9.4206743E−08 | −9.5292465E−08 |
| A15 | 4.1906494E−09 | 3.2139965E−09 | 1.1534656E−08 | −4.5905135E−09 |
| A16 | −5.7324597E−10 | 7.4774840E−10 | −1.7511888E−09 | 1.1984126E−09 |

Figure 3:
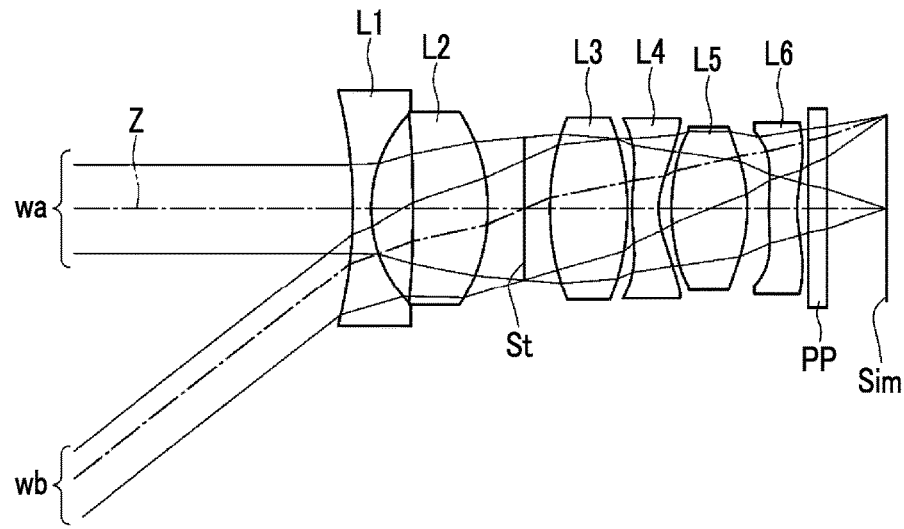
FIG. 3 is a cross-sectional view illustrating a configuration and optical paths of an imaging lens of Example 3 of the present invention.
Figure 12:
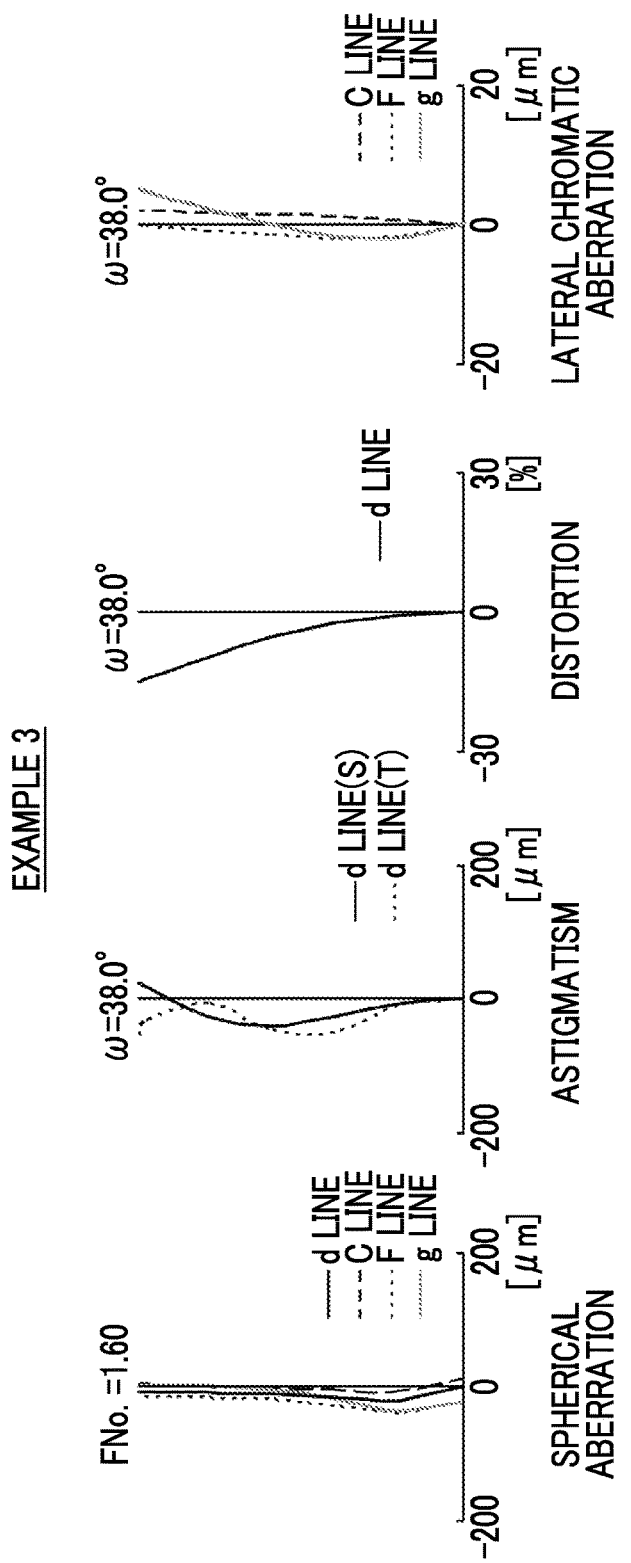
FIG. 12 is a diagram of aberrations of the imaging lens of Example 3 of the present invention.

Next, an imaging lens of Example 3 will be described. FIG. 3 is a cross-sectional view illustrating a configuration and optical paths of the imaging lens of Example 3. The imaging lens of Example 3 has the same lens configuration as that of Example 1. Table 7 shows lens data of the imaging lens of Example 3, Table 8 shows data about specification, and Table 9 shows aspheric coefficients. FIG. 12 shows a diagram of aberrations thereof.

TABLE 7

EXAMPLE 3-LENS DATA

| Si | Ri | Di | Ndj | vdj |
|---|---|---|---|---|
| 1 | −22.12956 | 0.850 | 1.58913 | 61.13 |
| 2 | 6.40035 | 1.926 | | |
| *3 | ∞ | 3.500 | 1.53156 | 55.12 |
| *4 | −8.90648 | 1.692 | | |
| 5(STOP) | ∞ | 1.198 | | |
| 6 | 11.61137 | 3.608 | 1.75500 | 52.32 |
| 7 | −11.61137 | 0.218 | | |
| *8 | 8.67631 | 1.233 | 1.63360 | 23.61 |

TABLE 7-continued

EXAMPLE 3-LENS DATA

| Si | Ri | Di | Ndj | vdj |
|---|---|---|---|---|
| *9 | 3.21958 | 0.604 | | |
| *10 | 8.71262 | 3.553 | 1.53156 | 55.12 |
| *11 | −8.11928 | 1.004 | | |
| *12 | 10.24151 | 1.364 | 1.63360 | 23.61 |
| *13 | 5.85914 | 0.500 | | |
| 14 | ∞ | 0.900 | 1.51680 | 64.20 |
| 15 | ∞ | 2.758 | | |

TABLE 8

EXAMPLE 3-SPECIFICATION (d LINE)

| | |
|---|---|
| f | 6.553 |
| Bf | 3.851 |
| FNo. | 1.60 |
| 2ω [°] | 76.0 |

TABLE 9

EXAMPLE 3-ASPHERIC COEFFICIENT

| SURFACE NUMBER | 3 | 4 | 8 | 9 |
|---|---|---|---|---|
| KA | 1.0000000E+00 | −4.8397263E+00 | −3.1893572E+00 | 3.0869844E−01 |
| A3 | 0.0000000E+00 | 0.0000000E+00 | 3.6630158E−18 | 0.0000000E+00 |
| A4 | −8.9415823E−05 | −1.7595448E−03 | −7.5961223E−03 | −1.4245494E−02 |

TABLE 9-continued

EXAMPLE 3-ASPHERIC COEFFICIENT

| | | | | |
|---|---|---|---|---|
| A5 | −1.1899567E−03 | 5.6879141E−05 | −2.7408420E−03 | −3.0731848E−03 |
| A6 | 7.5867201E−04 | 9.1014461E−05 | 2.1547244E−03 | 2.9901610E−03 |
| A7 | −1.2440016E−04 | 3.3932910E−05 | −1.2252576E−04 | 1.7319604E−04 |
| A8 | −7.5017724E−05 | −5.9785901E−05 | −2.4732791E−04 | −5.3567575E−04 |
| A9 | 3.3451978E−05 | 1.4400936E−05 | 6.2161237E−05 | 5.5252227E−05 |
| A10 | 6.7400099E−07 | 5.1804866E−06 | 1.1756743E−05 | 5.3562217E−05 |
| A11 | −2.3554763E−06 | −2.4096661E−06 | −5.7168309E−06 | −1.0141166E−05 |
| A12 | 1.9968530E−07 | −2.8857288E−08 | −5.3633077E−08 | −2.5481290E−06 |
| A13 | 7.5506858E−08 | 1.2385918E−07 | 2.2355335E−07 | 6.2204377E−07 |
| A14 | −1.0005595E−08 | −9.8748503E−09 | −1.3009688E−08 | 4.1580193E−08 |
| A15 | −9.6733561E−10 | −2.1511649E−09 | −3.2362282E−09 | −1.3487842E−08 |
| A16 | 1.5431821E−10 | 2.6500947E−10 | 2.8807541E−10 | 2.6908878E−10 |

| SURFACE NUMBER | 10 | 11 | 12 | 13 |
|---|---|---|---|---|
| KA | 9.7401939E−01 | −4.8151219E+00 | 6.6957923E−01 | −8.1808640E−01 |
| A3 | 1.5235972E−18 | 0.0000000E+00 | 0.0000000E+00 | 8.8004679E−18 |
| A4 | −1.6415276E−03 | −5.3590675E−03 | −1.2830959E−02 | −9.4965283E−03 |
| A5 | −5.1986844E−05 | −3.2110885E−04 | −1.6423578E−03 | −2.5705618E−03 |
| A6 | 2.5088287E−04 | 1.2143350E−03 | 9.1000590E−04 | 1.9738101E−03 |
| A7 | −4.1604935E−05 | −2.6156231E−05 | 1.4964900E−03 | 1.8556376E−04 |
| A8 | −3.4581812E−05 | −1.4871945E−04 | −8.6666426E−04 | −2.2605189E−04 |
| A9 | 1.7246167E−05 | 1.7611405E−05 | −8.7432387E−05 | −6.3315176E−06 |
| A10 | 2.5793701E−06 | 8.6336807E−06 | 1.9856547E−04 | 1.4153924E−05 |
| A11 | −1.6048242E−06 | −1.7308312E−06 | −4.2081260E−05 | 6.4049107E−07 |
| A12 | −8.4611105E−08 | −1.7316458E−07 | −1.3069998E−05 | −6.1452970E−07 |
| A13 | 5.6628161E−08 | 6.5898206E−08 | 5.9947844E−06 | −1.8852403E−08 |
| A14 | 1.5623939E−09 | −2.1796051E−09 | −1.2920570E−07 | 1.3156812E−08 |
| A15 | −7.1881127E−10 | −8.9344392E−10 | −2.2374688E−07 | 2.2139883E−10 |
| A16 | −1.3754231E−11 | 8.7178055E−11 | 2.6766886E−08 | −1.0689213E−10 |

Figure 4:
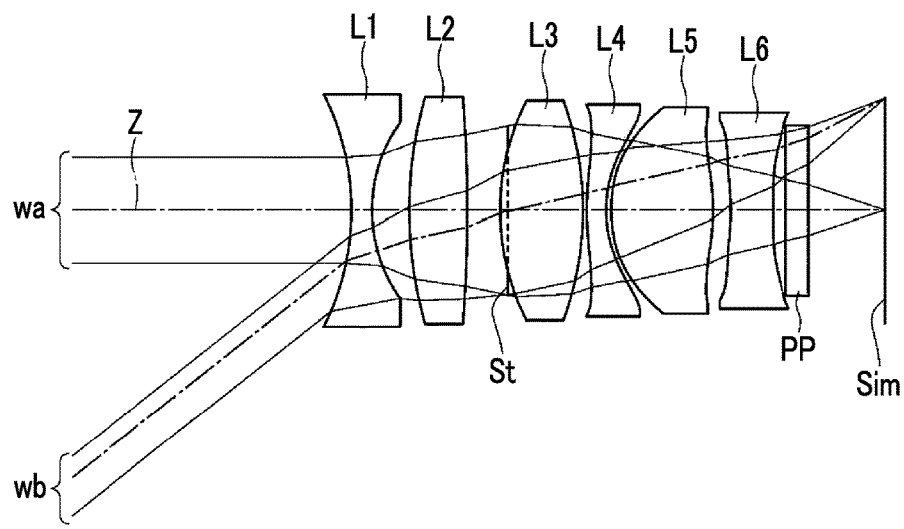
FIG. 4 is a cross-sectional view illustrating a configuration and optical paths of an imaging lens of Example 4 of the present invention.
Figure 13:
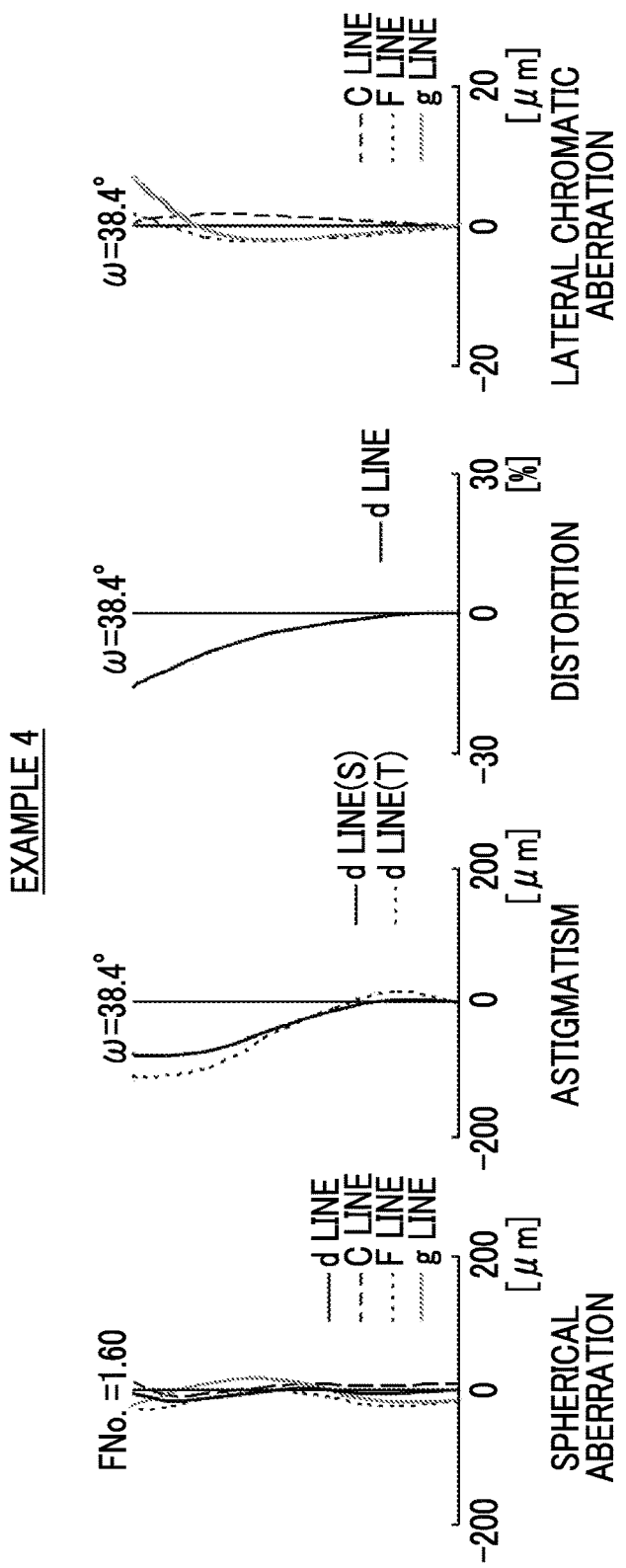
FIG. 13 is a diagram of aberrations of the imaging lens of Example 4 of the present invention.

Next, an imaging lens of Example 4 will be described. FIG. 4 is a cross-sectional view illustrating a configuration and optical paths of the imaging lens of Example 4. The imaging lens of Example 4 has the same lens configuration as that of Example 1 except that a material of the second lens L2 is glass. Table 10 shows lens data of the imaging lens of Example 4, Table 11 shows data about specification, and Table 12 shows aspheric coefficients. FIG. 13 shows a diagram of aberrations thereof

TABLE 10

EXAMPLE 4-LENS DATA

| Si | Ri | Di | Ndj | vdj |
|---|---|---|---|---|
| 1 | −10.00099 | 0.800 | 1.58913 | 61.13 |
| 2 | 5.87866 | 1.442 | | |
| 3 | 15.98098 | 2.241 | 1.75500 | 52.32 |
| 4 | −58.12316 | 1.575 | | |
| 5(STOP) | ∞ | −0.299 | | |
| 6 | 9.34195 | 3.207 | 1.75500 | 52.32 |
| 7 | −12.30363 | 0.150 | | |
| *8 | 11.09745 | 0.750 | 1.63360 | 23.61 |
| *9 | 4.78907 | 0.202 | | |
| *10 | 6.03036 | 3.944 | 1.53156 | 55.12 |
| *11 | −6.66667 | 0.706 | | |
| *12 | −7.40234 | 1.647 | 1.63360 | 23.61 |
| *13 | 348.16478 | 0.500 | | |
| 14 | ∞ | 0.900 | 1.51680 | 64.20 |
| 15 | ∞ | 2.960 | | |

TABLE 11

EXAMPLE 4-SPECIFICATION (d LINE)

| | |
|---|---|
| f | 6.503 |
| Bf | 4.053 |
| FNo. | 1.60 |
| 2ω [°] | 76.8 |

TABLE 12

EXAMPLE 4-ASPHERIC COEFFICIENT

| SURFACE NUMBER | 8 | 9 | 10 | 11 | 12 | 13 |
|---|---|---|---|---|---|---|
| KA | −4.9944319E+00 | 6.3948933E−01 | 1.0742736E+00 | −4.9532357E+00 | −4.9159295E+00 | 3.7747755E+00 |
| A3 | −9.5659648E−19 | −4.2743500E−17 | −9.6056684E−18 | −1.8651424E−18 | 2.8418413E−18 | −3.5573997E−17 |
| A4 | −2.9083043E−03 | −3.4671969E−03 | 5.9884842E−04 | 7.8171071E−03 | 1.5476070E−02 | 1.1899661E−02 |
| A5 | −3.7418935E−04 | 1.5822128E−03 | 2.3274874E−03 | −1.1528104E−03 | −2.5474922E−04 | −2.3553584E−03 |
| A6 | 3.8344217E−04 | 1.1603818E−03 | 4.2346243E−04 | −9.8711024E−04 | −4.8249285E−03 | −1.0970347E−03 |
| A7 | 9.8097355E−05 | −1.9833712E−04 | −2.0507391E−04 | 6.7560419E−04 | 1.9744677E−03 | 8.9928711E−04 |
| A8 | −1.0301517E−04 | −3.2788528E−04 | −2.0803166E−04 | −3.9866319E−05 | 2.8079053E−04 | −2.3843648E−04 |
| A9 | −5.6641325E−06 | −2.1391664E−05 | 7.6985591E−06 | −9.5390040E−05 | −4.0968499E−04 | 1.2044925E−06 |

TABLE 12-continued

EXAMPLE 4-ASPHERIC COEFFICIENT

| SURFACE NUMBER | 8 | 9 | 10 | 11 | 12 | 13 |
|---|---|---|---|---|---|---|
| A10 | 9.7579996E−06 | 6.3249074E−05 | 3.2084830E−05 | 1.8424683E−05 | 4.2795538E−05 | −3.6278611E−07 |
| A11 | 1.6355916E−06 | −1.6114846E−06 | −1.5166325E−06 | 5.0580043E−06 | 3.4177218E−05 | 3.7819919E−06 |
| A12 | −9.0061115E−07 | −3.9795920E−06 | −1.8262163E−06 | −1.0785462E−06 | −6.9470856E−06 | −6.1391150E−07 |
| A13 | −7.3505700E−08 | 6.3128791E−08 | 5.0724801E−08 | −1.6465192E−07 | −1.2920513E−06 | −3.6209486E−08 |
| A14 | 3.5265204E−08 | 1.3504653E−07 | 5.4957440E−08 | 3.2311419E−08 | 3.5455598E−07 | 9.2817683E−09 |
| A15 | 1.2424844E−09 | −1.3611728E−09 | −7.9835785E−10 | 1.9359987E−09 | 1.8293899E−08 | 1.3001623E−10 |
| A16 | −5.2658029E−10 | −1.7597228E−09 | −6.4104696E−10 | −3.6066282E−10 | −6.2728574E−09 | −5.6615547E−11 |

Figure 5:
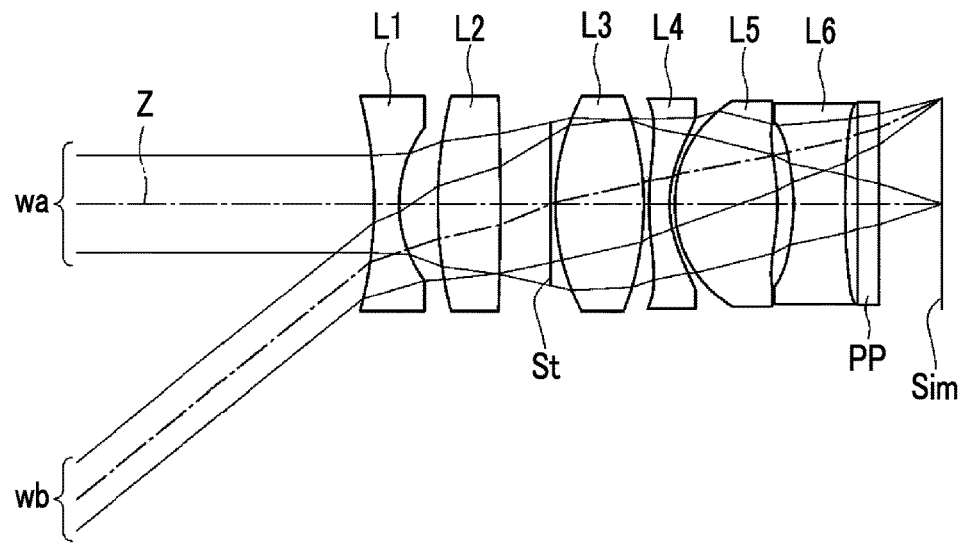
FIG. 5 is a cross-sectional view illustrating a configuration and optical paths of an imaging lens of Example 5 of the present invention.
Figure 14:
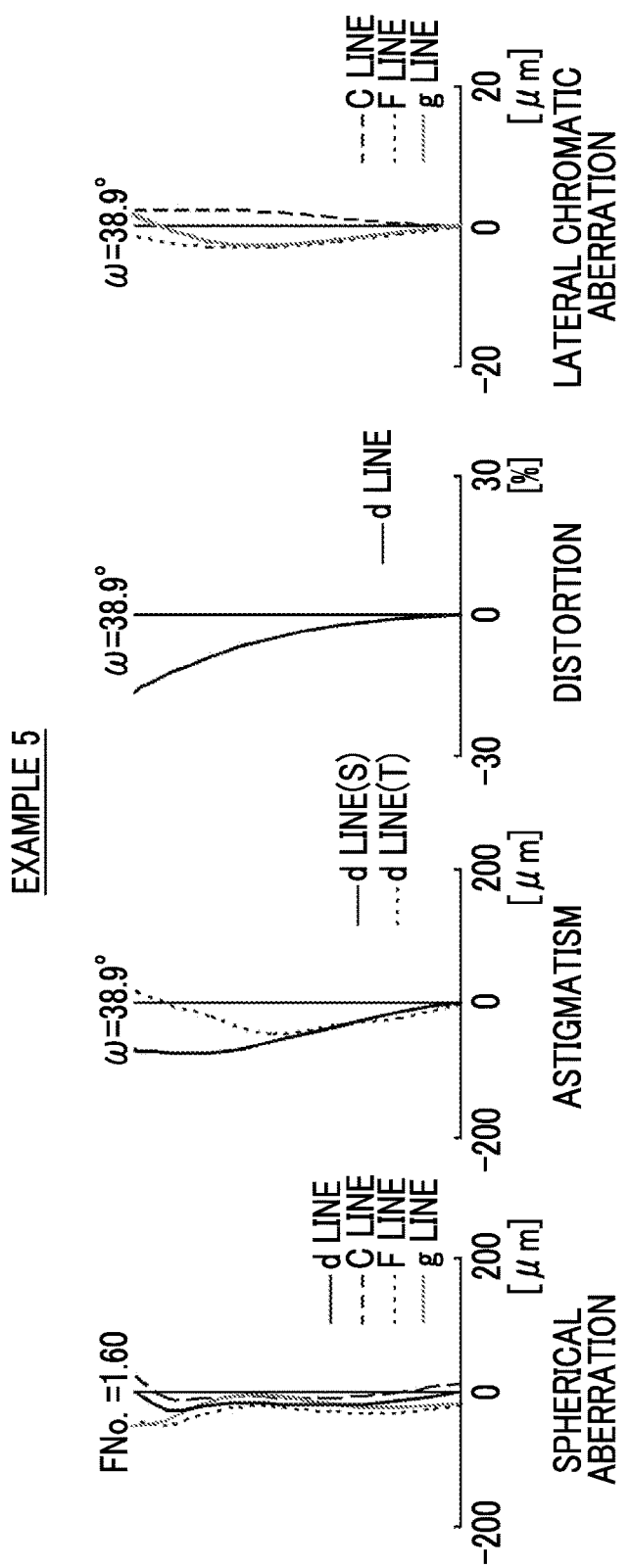
FIG. 14 is a diagram of aberrations of the imaging lens of Example 5 of the present invention.

Next, an imaging lens of Example 5 will be described. FIG. 5 is a cross-sectional view illustrating a configuration and optical paths of the imaging lens of Example 5. The imaging lens of Example 5 has the same lens configuration as that of Example 1 except that a material of the second lens L2 is glass. Table 13 shows lens data of the imaging lens of Example 5, Table 14 shows data about specification, and Table 15 shows aspheric coefficients. FIG. 14 shows a diagram of aberrations thereof.

TABLE 14

EXAMPLE 5-SPECIFICATION (d LINE)

| f | 6.531 |
|---|---|
| Bf | 3.717 |
| FNo. | 1.60 |
| 2ω [°] | 77.8 |

TABLE 15

EXAMPLE 5-ASPHERIC COEFFICIENT

| SURFACE NUMBER | 8 | 9 | 10 | 11 | 12 | 13 |
|---|---|---|---|---|---|---|
| KA | −3.0483259E+00 | 8.1346525E−01 | 1.2315539E+00 | 2.2133754E−01 | −4.7188471E+00 | −4.3373647E−01 |
| A3 | 2.5227811E−18 | −5.2902413E−17 | 2.5416577E−17 | 4.8297133E−17 | 1.2897117E−18 | 2.1696298E−16 |
| A4 | −2.7312921E−03 | −1.1463440E−03 | 3.9017128E−03 | 4.6815446E−03 | 2.7637688E−03 | 1.7570127E−03 |
| A5 | −3.8006373E−04 | 5.7271889E−04 | 9.0350016E−05 | 3.0059019E−03 | 5.2335270E−03 | 2.4275719E−03 |
| A6 | 3.5728748E−04 | −9.1918814E−04 | −7.7345510E−04 | −1.9325463E−03 | −3.9876551E−03 | −1.1250364E−03 |
| A7 | −1.0320016E−04 | 3.2537773E−04 | 3.8195189E−04 | −1.8242950E−04 | −2.1688467E−05 | −9.4730277E−05 |
| A8 | −2.7861004E−05 | 8.6846987E−05 | −2.6134373E−05 | 3.5303533E−04 | 7.0890270E−04 | −4.7538040E−05 |
| A9 | 3.0859328E−05 | −1.2195175E−04 | −7.0312697E−05 | −1.5280230E−05 | −1.4926017E−04 | 1.2166435E−04 |
| A10 | −6.4324125E−06 | 2.6401541E−05 | 2.0700172E−05 | −3.5053044E−05 | −5.0248865E−05 | −3.3710040E−05 |
| A11 | −3.7821210E−07 | 6.0229914E−06 | 3.0213406E−06 | 1.0524338E−06 | 1.8748831E−05 | −1.5363466E−06 |
| A12 | 2.7251806E−07 | −2.0815075E−06 | −1.3765208E−06 | 2.6965101E−06 | 7.8709283E−07 | 1.1068861E−06 |
| A13 | −2.4963264E−08 | −2.2257300E−07 | −9.3798119E−08 | −9.0817770E−08 | −8.8259189E−07 | 1.2292234E−07 |
| A14 | −3.3485143E−09 | 8.6041333E−08 | 4.8981765E−08 | −9.5996182E−08 | 5.5377170E−08 | −3.9447209E−08 |
| A15 | 1.0036278E−09 | 2.5664127E−09 | 8.8132430E−10 | 1.6160156E−09 | 1.4711884E−08 | −1.6287528E−09 |
| A16 | −6.6419480E−11 | −1.2365101E−09 | −6.4337325E−10 | 1.3624089E−09 | −1.7506507E−09 | 4.7154607E−10 |

TABLE 13

EXAMPLE 5-LENS DATA

| Si | Ri | Di | Ndj | vdj |
|---|---|---|---|---|
| 1 | −17.58259 | 1.044 | 1.58913 | 61.13 |
| 2 | 5.34072 | 1.614 | | |
| 3 | 18.64849 | 2.636 | 1.75500 | 52.32 |
| 4 | −131.13431 | 2.108 | | |
| 5(STOP) | ∞ | 0.193 | | |
| 6 | 9.77581 | 3.689 | 1.75500 | 52.32 |
| 7 | −12.51082 | 0.220 | | |
| *8 | 10.63266 | 0.857 | 1.63350 | 23.62 |
| *9 | 4.85942 | 0.227 | | |
| *10 | 5.98876 | 4.276 | 1.53114 | 55.43 |
| *11 | −7.42135 | 0.675 | | |
| *12 | −6.95358 | 2.189 | 1.63350 | 23.62 |
| *13 | 184.22198 | 0.500 | | |
| 14 | ∞ | 0.900 | 1.51680 | 64.20 |
| 15 | ∞ | 2.623 | | |

Figure 6:
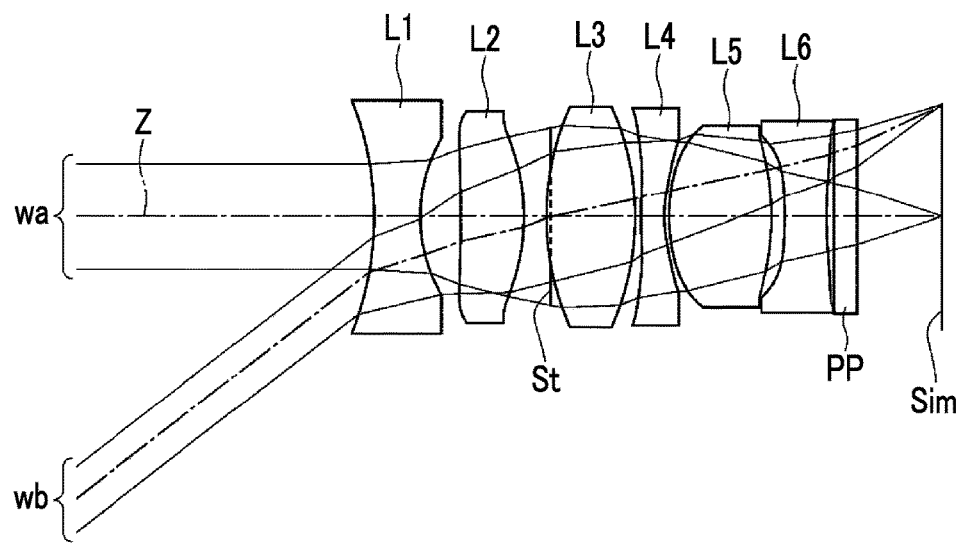
FIG. 6 is a cross-sectional view illustrating a configuration and optical paths of an imaging lens of Example 6 of the present invention.
Figure 15:
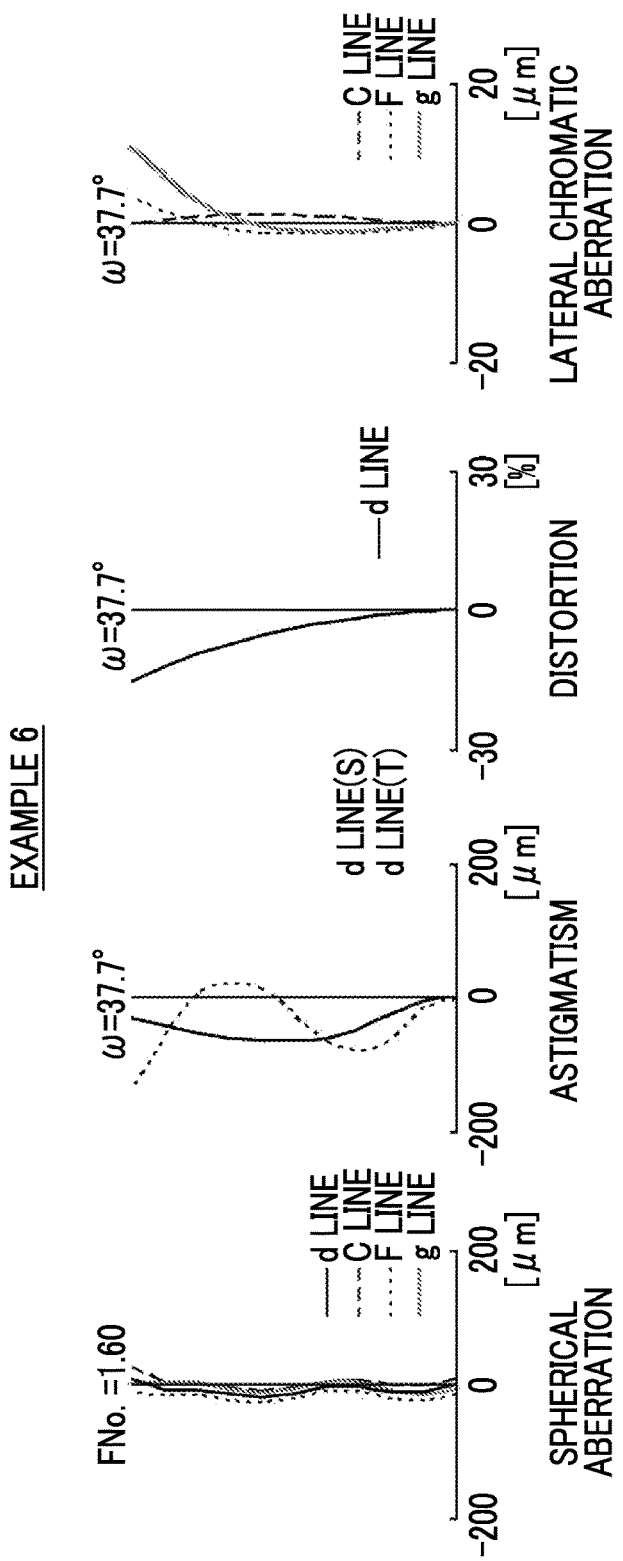
FIG. 15 is a diagram of aberrations of the imaging lens of Example 6 of the present invention.

Next, an imaging lens of Example 6 will be described. FIG. 6 is a cross-sectional view illustrating a configuration and optical paths of the imaging lens of Example 6. The imaging lens of Example 6 has the same lens configuration as that of Example 1. Table 16 shows lens data of the imaging lens of Example 6, Table 17 shows data about specification, and Table 18 shows aspheric coefficients. FIG. 15 shows a diagram of aberrations thereof.

TABLE 16

EXAMPLE 6-LENS DATA

| Si | Ri | Di | Ndj | vdj |
|---|---|---|---|---|
| 1 | −12.14555 | 1.776 | 1.58913 | 61.13 |
| 2 | 5.95384 | 1.556 | | |
| *3 | ∞ | 2.459 | 1.53156 | 55.12 |
| *4 | −8.56836 | 1.031 | | |
| 5(STOP) | ∞ | −0.161 | | |
| 6 | 10.37240 | 3.414 | 1.75500 | 52.32 |
| 7 | −10.37240 | 0.224 | | |
| *8 | 13.37265 | 0.900 | 1.63360 | 23.61 |
| *9 | 4.59151 | 0.185 | | |
| *10 | 7.11373 | 3.935 | 1.53156 | 55.12 |

TABLE 16-continued

EXAMPLE 6-LENS DATA

| Si | Ri | Di | Ndj | vdj |
|---|---|---|---|---|
| *11 | −8.59472 | 0.513 | | |
| *12 | −16.60786 | 1.613 | 1.63360 | 23.61 |
| *13 | 17.47623 | 0.300 | | |
| 14 | ∞ | 0.900 | 1.51680 | 64.20 |
| 15 | ∞ | 3.260 | | |

TABLE 17

EXAMPLE 6-SPECIFICATION (d LINE)

| | |
|---|---|
| f | 6.550 |
| Bf | 4.153 |
| FNo. | 1.60 |
| 2ω [°] | 75.4 |

TABLE 18

EXAMPLE 6-ASPHERIC COEFFICIENT

| SURFACE NUMBER | 3 | 4 | 8 | 9 |
|---|---|---|---|---|
| KA | 1.0000000E+00 | −3.5125808E+00 | −4.6875697E+00 | 9.0871372E−01 |
| A3 | −1.6743394E−18 | −1.5041264E−18 | 1.3131547E−18 | 2.1335825E−19 |
| A4 | −1.3814853E−03 | −3.1222245E−03 | −1.0841737E−02 | −1.2582168E−02 |
| A5 | −1.9117629E−03 | 1.8276427E−03 | −1.7450137E−03 | −2.8066712E−03 |
| A6 | 1.9175794E−03 | −1.2026467E−03 | 2.0614099E−03 | 1.3451749E−03 |
| A7 | −3.7457426E−04 | 2.4192347E−04 | 1.2592922E−04 | 9.6883199E−04 |
| A8 | −2.5197162E−04 | 1.5005150E−04 | −2.0913420E−04 | −1.8805522E−04 |
| A9 | 1.2096037E−04 | −6.3310562E−05 | −4.3616835E−06 | −1.4810761E−04 |
| A10 | 3.7169415E−06 | −4.2322075E−06 | 1.4081000E−05 | 3.8636047E−05 |
| A11 | −1.0160836E−05 | 4.1371081E−06 | 5.7320800E−07 | 6.0110341E−06 |
| A12 | 9.8052225E−07 | 4.2252341E−08 | −7.9674730E−07 | −2.4515069E−06 |
| A13 | 3.5858272E−07 | −8.5789186E−08 | −2.6135779E−08 | −1.1095355E−07 |
| A14 | −5.7194678E−08 | −1.5736199E−08 | 2.6872469E−08 | 9.5454157E−08 |
| A15 | −4.5723709E−09 | 1.9767841E−11 | 4.1629453E−10 | −1.2346253E−09 |
| A16 | 9.3905882E−10 | 7.1276796E−10 | −3.7509514E−10 | −1.6749647E−09 |

| SURFACE NUMBER | 10 | 11 | 12 | 13 |
|---|---|---|---|---|
| KA | 1.3070884E+00 | −5.0000000E+00 | −2.6919965E+00 | −9.4345117E−01 |
| A3 | 9.4457943E−18 | −8.3163155E−19 | 0.0000000E+00 | 1.2683034E−17 |
| A4 | 3.7038080E−03 | 2.3442070E−03 | −1.8047519E−03 | 4.2863339E−04 |
| A5 | −9.8791002E−04 | 4.5847056E−04 | 2.8084684E−03 | −3.8896290E−03 |
| A6 | −2.2885611E−03 | −8.5479317E−04 | −3.8535926E−03 | 3.6411800E−03 |
| A7 | 1.2375859E−03 | 5.6898761E−04 | 6.8374809E−04 | −9.9084546E−04 |
| A8 | 2.5001224E−04 | −2.6192266E−04 | 4.7314390E−04 | −6.4241972E−04 |
| A9 | −2.0701515E−04 | −1.1631903E−04 | −2.4315516E−04 | 4.2414778E−04 |
| A10 | −3.1890430E−06 | 8.6807061E−05 | 1.7043075E−06 | −3.1086598E−05 |
| A11 | 1.3175804E−05 | 9.2583623E−06 | 2.3306630E−05 | −2.1756051E−05 |
| A12 | −1.3521333E−07 | −1.0102199E−05 | −3.6632413E−06 | 1.8115394E−06 |
| A13 | −4.2051345E−07 | −3.9831954E−07 | −9.3133915E−07 | 7.9376826E−07 |
| A14 | −3.8640407E−10 | 5.8672944E−07 | 2.4364923E−07 | −3.8905737E−08 |
| A15 | 4.9832649E−09 | 7.3434633E−09 | 1.3672992E−08 | −9.0666643E−09 |
| A16 | 2.5687554E−10 | −1.3563464E−08 | −5.1568292E−09 | −8.0259026E−10 |

Figure 7:
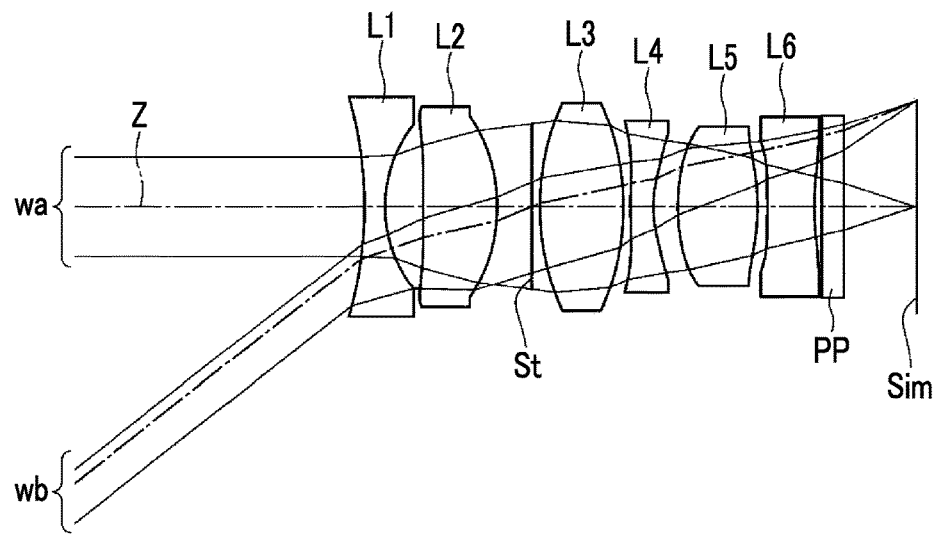
FIG. 7 is a cross-sectional view illustrating a configuration and optical paths of an imaging lens of Example 7 of the present invention.
Figure 16:
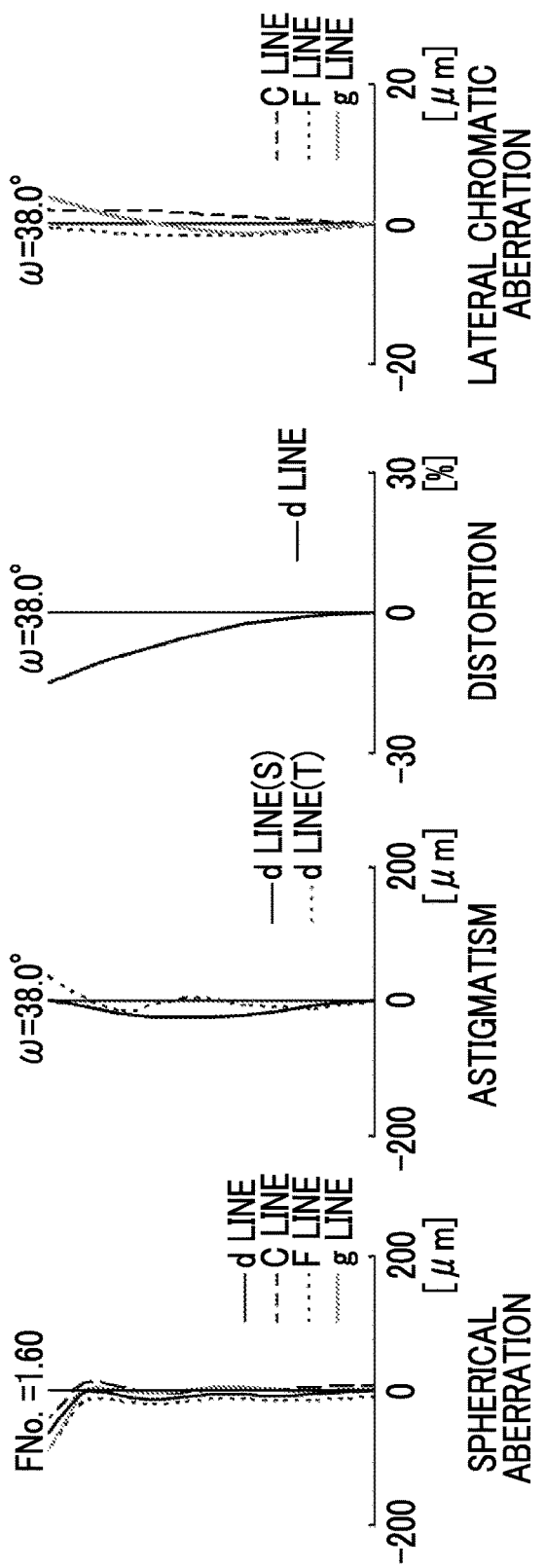
FIG. 16 is a diagram of aberrations of the imaging lens of Example 7 of the present invention.

Next, an imaging lens of Example 7 will be described. FIG. 7 is a cross-sectional view illustrating a configuration and optical paths of the imaging lens of Example 7. The imaging lens of Example 7 has the same lens configuration as that of Example 1. Table 19 shows lens data of the imaging lens of Example 7, Table 20 shows data about specification, and Table 21 shows aspheric coefficients. FIG. 16 shows a diagram of aberrations thereof.

TABLE 19

EXAMPLE 7-LENS DATA

| Si | Ri | Di | Ndj | vdj |
|---|---|---|---|---|
| 1 | −16.25375 | 0.840 | 1.58913 | 61.13 |
| 2 | 5.41263 | 1.550 | | |
| *3 | ∞ | 3.034 | 1.53156 | 55.12 |
| *4 | −7.13249 | 1.402 | | |
| 5(STOP) | ∞ | 0.336 | | |
| 6 | 10.34211 | 3.400 | 1.75500 | 52.32 |
| 7 | −10.30211 | 0.281 | | |
| *8 | 15.90013 | 0.933 | 1.63360 | 23.61 |
| *9 | 4.38936 | 1.000 | | |
| *10 | 8.95120 | 3.234 | 1.53156 | 55.12 |
| *11 | −8.15072 | 0.393 | | |
| *12 | −193.72976 | 1.948 | 1.63360 | 23.61 |
| *13 | 9.98584 | 0.300 | | |
| 14 | ∞ | 0.900 | 1.51680 | 64.20 |
| 15 | ∞ | 2.957 | | |

TABLE 20

EXAMPLE 7-SPECIFICATION (d LINE)

| | |
|---|---|
| f | 6.544 |
| Bf | 3.850 |
| FNo. | 1.60 |
| 2ω [°] | 76.0 |

TABLE 21

EXAMPLE 7-ASPHERIC COEFFICIENT

| SURFACE NUMBER | 3 | 4 | 8 | 9 |
|---|---|---|---|---|
| KA | 1.0000000E+00 | −3.3442831E+00 | −4.9877727E+00 | 8.0301571E−01 |
| A3 | 0.0000000E+00 | −1.9485093E−19 | 1.5162084E−18 | −6.1379449E−19 |
| A4 | −9.4248005E−04 | −1.9334993E−03 | −8.7473058E−03 | −1.1093043E−02 |
| A5 | −1.3408173E−03 | −1.8204178E−04 | −1.1118407E−03 | −2.1839606E−03 |
| A6 | 1.4605185E−03 | −8.3738261E−06 | 1.3171626E−03 | 1.8956476E−03 |
| A7 | −5.0789806E−04 | 7.8766054E−05 | −1.2855224E−04 | 4.1392467E−04 |
| A8 | −1.3214264E−04 | −1.0559127E−05 | −3.0038134E−05 | −4.8333158E−04 |
| A9 | 1.2818292E−04 | −6.8575916E−06 | 3.3843451E−05 | 1.6115353E−05 |
| A10 | −1.0813382E−05 | 1.4168443E−06 | −1.1500216E−05 | 9.0185015E−05 |
| A11 | −1.0276394E−05 | 2.4618983E−07 | −2.2882798E−06 | −1.7910024E−05 |
| A12 | 1.9419087E−06 | −6.1382387E−08 | 1.1306288E−06 | −7.0803925E−06 |
| A13 | 3.5989264E−07 | −3.7044375E−09 | 8.6712675E−08 | 1.7412286E−06 |
| A14 | −9.3558896E−08 | 1.1719841E−09 | −4.5987116E−08 | 2.5391064E−07 |
| A15 | −4.6786019E−09 | 1.7132468E−11 | −1.4157776E−09 | −5.8527889E−08 |
| A16 | 1.5720900E−09 | −9.1971462E−12 | 7.0575194E−10 | −1.8089283E−09 |

| SURFACE NUMBER | 10 | 11 | 12 | 13 |
|---|---|---|---|---|
| KA | 1.1694738E+00 | −4.8177726E+00 | 1.6217576E+00 | −4.8625921E−01 |
| A3 | 7.5284570E−18 | 1.6682540E−18 | 0.0000000E+00 | 5.5781354E−19 |
| A4 | 2.8755291E−03 | 3.6719046E−03 | −2.7136385E−03 | −2.7204546E−03 |
| A5 | 9.9103800E−04 | −3.0988439E−04 | 1.5457626E−03 | −1.7192082E−03 |
| A6 | −3.9567740E−03 | −1.0944062E−03 | −3.2230646E−03 | 1.0721644E−03 |
| A7 | 2.6395809E−03 | 1.5193198E−04 | 9.7865500E−04 | −3.6057869E−04 |
| A8 | 4.7507419E−05 | 1.5263605E−04 | 3.1319524E−04 | −3.5937410E−05 |
| A9 | −6.8823865E−04 | −1.1853238E−05 | −2.5199091E−04 | 9.7647934E−05 |
| A10 | 1.8547075E−04 | −1.1332813E−05 | 3.0082405E−05 | −2.2083153E−05 |
| A11 | 4.9994684E−05 | 4.6153077E−07 | 2.2270456E−05 | −4.4726772E−06 |
| A12 | −2.2948286E−05 | 4.6114378E−07 | −6.6987925E−06 | 1.5886012E−06 |
| A13 | −1.3849393E−06 | −9.2506034E−09 | −8.6591207E−07 | 1.3817210E−07 |
| A14 | 1.1601673E−06 | −9.6912519E−09 | 4.0890731E−07 | −5.7913737E−08 |
| A15 | −5.6169536E−09 | 7.5129298E−11 | 1.2782284E−08 | −1.6340606E−09 |
| A16 | −1.9463837E−08 | 8.2510123E−11 | −8.6474326E−09 | 8.0443510E−10 |

Figure 8:
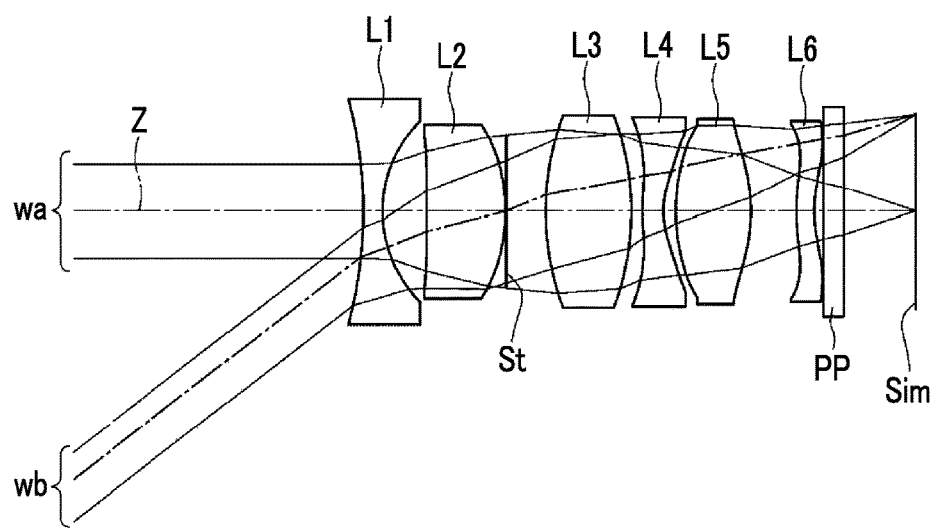
FIG. 8 is a cross-sectional view illustrating a configuration and optical paths of an imaging lens of Example 8 of the present invention.
Figure 17:
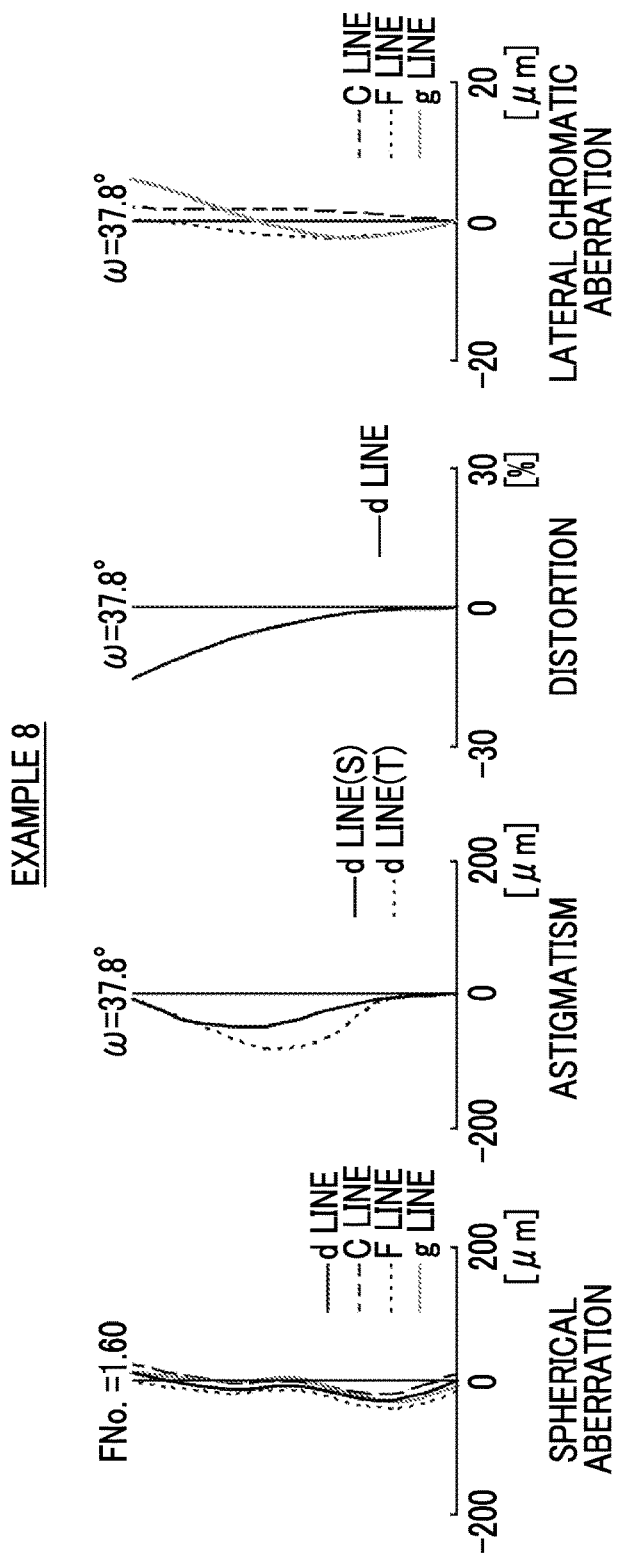
FIG. 17 is a diagram of aberrations of the imaging lens of Example 8 of the present invention.

Next, an imaging lens of Example 8 will be described. FIG. 8 is a cross-sectional view illustrating a configuration and optical paths of the imaging lens of Example 8. The imaging lens of Example 8 has the same lens configuration as that of Example 1. Table 22 shows lens data of the imaging lens of Example 8, Table 23 shows data about specification, and Table 24 shows aspheric coefficients. FIG. 17 shows a diagram of aberrations thereof.

TABLE 22

EXAMPLE 8-LENS DATA

| Si | Ri | Di | Ndj | νdj |
|---|---|---|---|---|
| 1 | −19.34105 | 0.850 | 1.58913 | 61.13 |
| 2 | 5.66267 | 1.950 | | |
| *3 | ∞ | 3.500 | 1.53156 | 55.12 |
| *4 | −8.12252 | 0.028 | | |
| 5(STOP) | ∞ | 1.744 | | |
| 6 | 12.10079 | 3.776 | 1.75500 | 52.32 |
| 7 | −12.10079 | 0.498 | | |
| *8 | 9.54617 | 0.913 | 1.63360 | 23.61 |

TABLE 22-continued

EXAMPLE 8-LENS DATA

| Si | Ri | Di | Ndj | νdj |
|---|---|---|---|---|
| *9 | 3.23658 | 0.554 | | |
| *10 | 8.63814 | 3.304 | 1.53156 | 55.12 |
| *11 | −7.45740 | 2.000 | | |
| *12 | 8.03644 | 0.827 | 1.63360 | 23.61 |
| *13 | 5.71588 | 0.400 | | |
| 14 | ∞ | 0.900 | 1.51680 | 64.20 |
| 15 | ∞ | 3.167 | | |

TABLE 23

LE 8-SPECIFICATION (d LINE)

| | |
|---|---|
| f | 6.547 |
| Bf | 4.160 |
| FNo. | 1.60 |
| 2ω [°] | 75.6 |

TABLE 24

EXAMPLE 8-ASPHERIC COEFFICIENT

| SURFACE NUMBER | 3 | 4 | 8 | 9 |
|---|---|---|---|---|
| KA | 1.0000000E+00 | −3.5109320E+00 | −3.5443512E+00 | 2.7924319E−01 |
| A3 | 3.6268887E−18 | 1.4388310E−18 | 3.5384706E−18 | −1.5760905E−18 |
| A4 | 7.8311576E−03 | 2.3496588E−05 | −1.2067886E−02 | −1.6365306E−02 |

TABLE 24-continued

EXAMPLE 8-ASPHERIC COEFFICIENT

| | | | | |
|---|---|---|---|---|
| A5 | −1.4972802E−02 | −1.9917596E−03 | −2.5254294E−03 | −2.8778073E−03 |
| A6 | 8.9718947E−03 | −3.8743875E−04 | 2.8254754E−03 | 3.2859761E−03 |
| A7 | 4.7053812E−04 | 1.7078526E−03 | −1.0181756E−04 | 1.9195123E−04 |
| A8 | −2.8148367E−03 | −7.1723090E−04 | −3.0566823E−04 | −5.2742563E−04 |
| A9 | 7.8272928E−04 | −1.5330491E−04 | 5.6521995E−05 | 5.1980660E−05 |
| A10 | 2.8603321E−04 | 1.6293556E−04 | 1.5589567E−05 | 4.7360653E−05 |
| A11 | −1.5303656E−04 | −1.6726693E−05 | −5.1474954E−06 | −9.8036076E−06 |
| A12 | −6.1526472E−06 | −1.1611992E−05 | −2.5932787E−07 | −1.8522610E−06 |
| A13 | 1.2220870E−05 | 2.8875609E−06 | 1.9744804E−07 | 6.0202007E−07 |
| A14 | −9.1103034E−07 | 1.4793403E−07 | −5.8911068E−09 | 7.4331114E−09 |
| A15 | −3.8416224E−07 | −1.0818433E−07 | −2.7951837E−09 | −1.3001389E−08 |
| A16 | 5.3682809E−08 | 9.1462255E−09 | 1.8471961E−10 | 9.0516548E−10 |

| SURFACE NUMBER | 10 | 11 | 12 | 13 |
|---|---|---|---|---|
| KA | 3.5165100E−01 | −4.9649025E+00 | 1.4244365E+00 | −6.1958687E−01 |
| A3 | 2.7314293E−18 | −1.4086856E−18 | 2.2066626E−18 | −1.7284238E−17 |
| A4 | −1.3673579E−05 | −9.9178467E−05 | −5.9494042E−03 | −5.2448957E−03 |
| A5 | 1.9264688E−04 | −8.1490652E−04 | 1.0356265E−03 | −1.2665232E−03 |
| A6 | −1.7276473E−04 | 2.9779523E−04 | 1.6000489E−04 | 7.4603982E−04 |
| A7 | −5.9250256E−05 | 7.8052431E−05 | 7.0309291E−04 | −9.6927450E−05 |
| A8 | 2.5950079E−05 | −4.6474196E−05 | −4.0249422E−04 | −1.3564138E−05 |
| A9 | 1.4054808E−05 | 4.2645916E−06 | −2.2259500E−05 | 2.1234876E−05 |
| A10 | −2.1776808E−06 | 1.7447557E−06 | 8.0112504E−05 | −7.5135776E−06 |
| A11 | −1.1345998E−06 | −7.4541779E−07 | −1.6353890E−05 | −6.3756158E−07 |
| A12 | 1.1401294E−07 | 6.9097088E−08 | −4.5745914E−06 | 5.5830902E−07 |
| A13 | 3.6440085E−08 | 3.0667674E−08 | 1.8200806E−06 | 1.3043522E−08 |
| A14 | −2.7823024E−09 | −5.5511266E−09 | −1.2894080E−08 | −1.9509058E−08 |
| A15 | −4.2583883E−10 | −4.1415040E−10 | −5.5232033E−08 | −9.9104412E−11 |
| A16 | 2.5525692E−11 | 8.9313171E−11 | 5.3963086E−09 | 2.5757397E−10 |

Figure 9:
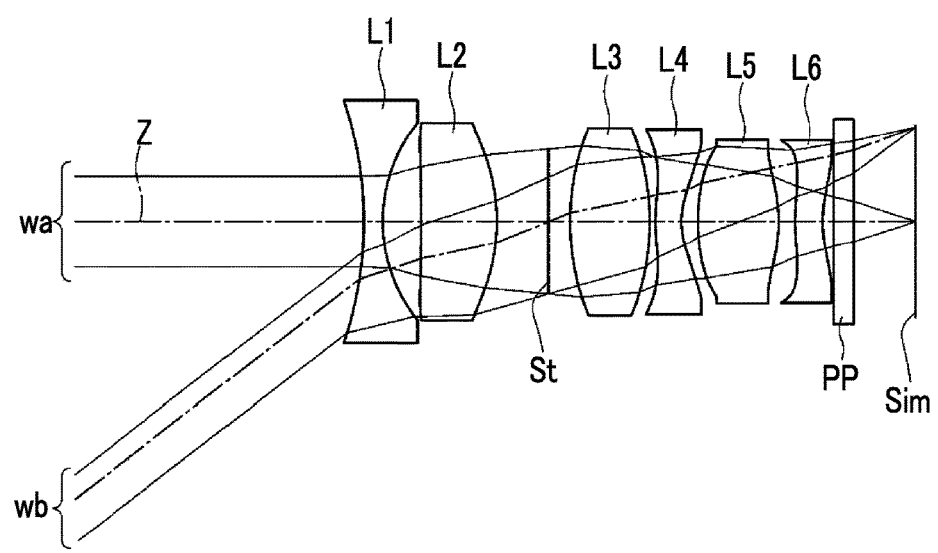
FIG. 9 is a cross-sectional view illustrating a configuration and optical paths of an imaging lens of Example 9 of the present invention.
Figure 18:
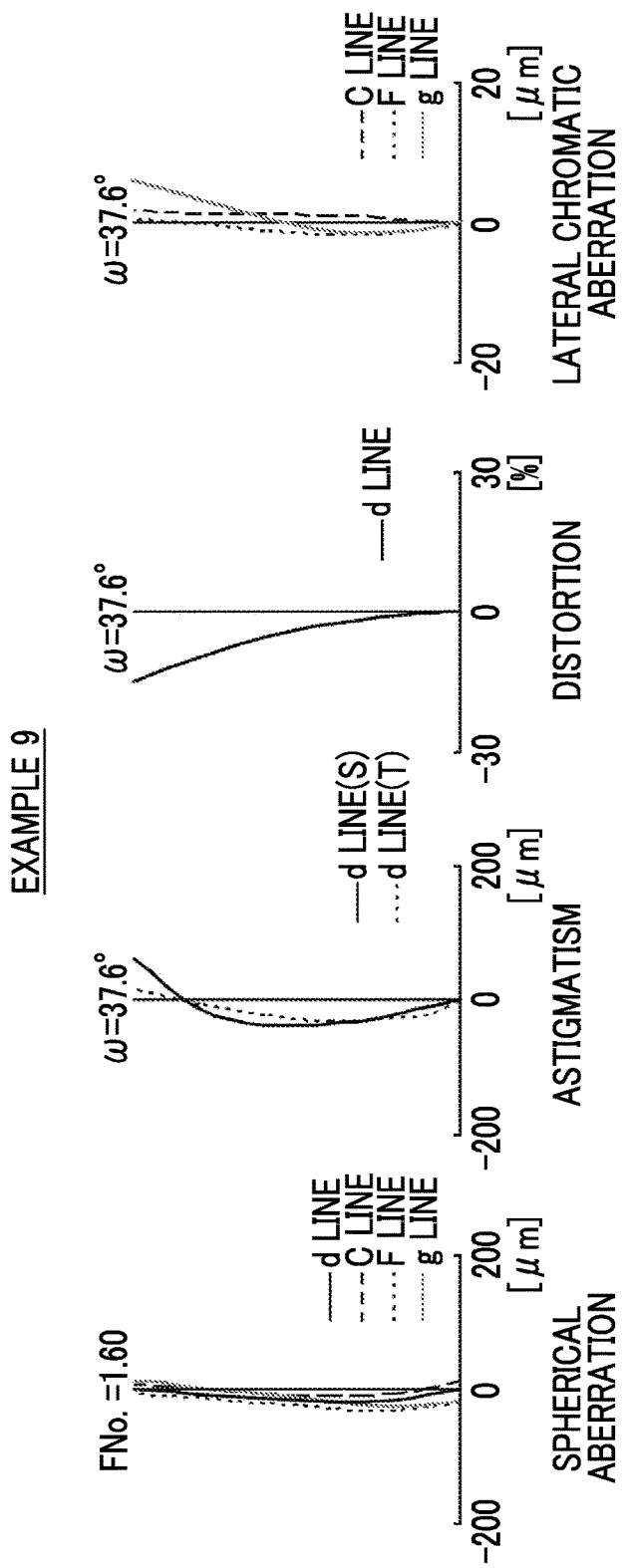
FIG. 18 is a diagram of aberrations of the imaging lens of Example 9 of the present invention.

Next, an imaging lens of Example 9 will be described. FIG. 9 is a cross-sectional view illustrating a configuration and optical paths of the imaging lens of Example 9. The imaging lens of Example 9 has the same lens configuration as that of Example 1. Table 25 shows lens data of the imaging lens of Example 9, Table 26 shows data about specification, and Table 27 shows aspheric coefficients. FIG. 18 shows a diagram of aberrations thereof.

TABLE 25

EXAMPLE 9-LENS DATA

| Si | Ri | Di | Ndj | vdj |
|---|---|---|---|---|
| 1 | −17.10410 | 0.850 | 1.58913 | 61.13 |
| 2 | 7.20431 | 1.723 | | |
| *3 | −1000.00000 | 3.453 | 1.53156 | 55.12 |
| *4 | −9.02103 | 2.328 | | |
| 5(STOP) | ∞ | 0.974 | | |
| 6 | 11.32842 | 3.600 | 1.75500 | 52.32 |
| 7 | −11.32842 | 0.251 | | |
| *8 | 8.53276 | 1.172 | 1.63360 | 23.61 |

TABLE 25-continued

EXAMPLE 9-LENS DATA

| Si | Ri | Di | Ndj | vdj |
|---|---|---|---|---|
| *9 | 3.22088 | 0.741 | | |
| *10 | 8.38183 | 3.629 | 1.53156 | 55.12 |
| *11 | −7.68288 | 0.757 | | |
| *12 | 10.17482 | 1.273 | 1.63360 | 23.61 |
| *13 | 5.32033 | 0.500 | | |
| 14 | ∞ | 0.900 | 1.51680 | 64.20 |
| 15 | ∞ | 2.791 | | |

TABLE 26

EXAMPLE 9-SPECIFICATION (d LINE)

| | |
|---|---|
| f | 6.561 |
| Bf | 3.885 |
| FNo. | 1.60 |
| 2ω [°] | 75.2 |

TABLE 27

EXAMPLE 9-ASPHERIC COEFFICIENT

| SURFACE NUMBER | 3 | 4 | 8 | 9 |
|---|---|---|---|---|
| KA | 4.9999576E+00 | −4.7260137E+00 | −3.1949383E+00 | 2.7652298E−01 |
| A3 | 4.8930671E−19 | −4.4408921E−19 | 0.0000000E+00 | 0.0000000E+00 |
| A4 | −1.5513667E−04 | −1.0929871E−03 | −7.7891815E−03 | −1.3863581E−02 |
| A5 | −8.8362056E−04 | −2.1770563E−04 | −2.7438018E−03 | −2.8909395E−03 |
| A6 | 6.6557494E−04 | 8.3897143E−05 | 2.1121789E−03 | 2.4978266E−03 |
| A7 | −1.3116044E−04 | 6.5856857E−05 | −1.8988314E−04 | 1.1711152E−04 |
| A8 | −6.2736471E−05 | −3.8979524E−05 | −2.1720469E−04 | −4.1996307E−04 |
| A9 | 3.0794420E−05 | 1.6664275E−06 | 8.0059240E−05 | 7.1830006E−05 |
| A10 | 4.0311470E−07 | 3.4125827E−06 | 5.8866513E−06 | 4.2914292E−05 |

TABLE 27-continued

| EXAMPLE 9-ASPHERIC COEFFICIENT | | | | |
|---|---|---|---|---|
| A11 | −2.0705051E−06 | −5.9422873E−07 | −7.4975245E−06 | −1.2396322E−05 |
| A12 | 1.6662940E−07 | −1.0487441E−07 | 4.5360057E−07 | −2.1770217E−06 |
| A13 | 6.4182380E−08 | 2.8449829E−08 | 3.0335696E−07 | 7.5884252E−07 |
| A14 | −7.8360473E−09 | 7.4449014E−10 | −3.3450357E−08 | 4.2066041E−08 |
| A15 | −7.9852786E−10 | −4.2604966E−10 | −4.5669248E−09 | −1.6585832E−08 |
| A16 | 1.1543761E−10 | 1.1243345E−11 | 5.9733694E−10 | 7.7384212E−11 |

| SURFACE NUMBER | 10 | 11 | 12 | 13 |
|---|---|---|---|---|
| KA | 1.0884169E+00 | −4.9152080E+00 | 9.1607133E−01 | −6.8889559E−01 |
| A3 | 4.4561791E−18 | −2.5090343E−18 | −3.4731508E−18 | 7.1062946E−18 |
| A4 | −2.9202389E−04 | −2.1877042E−03 | −6.4858467E−03 | −7.4337374E−03 |
| A5 | −3.0270732E−04 | −7.4501025E−04 | −2.9508051E−03 | −1.0602737E−03 |
| A6 | 9.8640063E−05 | 1.2258394E−03 | −6.3368766E−04 | 1.1813074E−03 |
| A7 | −4.5534526E−05 | 1.2619031E−05 | 3.4016607E−03 | −5.9775725E−05 |
| A8 | −4.6249988E−05 | −2.5821351E−04 | −1.3193866E−03 | −8.1016764E−05 |
| A9 | 4.6876363E−05 | 5.7751667E−05 | −4.8709570E−04 | 1.2375254E−05 |
| A10 | 5.1918250E−06 | 2.0687125E−05 | 4.1348589E−04 | 1.0201455E−06 |
| A11 | −5.9619194E−06 | −8.5249452E−06 | −2.9931602E−05 | −3.1955005E−07 |
| A12 | −1.6188278E−07 | −2.3926742E−07 | −3.8501061E−05 | 3.3840844E−08 |
| A13 | 2.7593094E−07 | 4.5631944E−07 | 9.0645818E−06 | 5.8832804E−09 |
| A14 | 1.7609390E−09 | −3.8641368E−08 | 7.2439751E−07 | −2.4667754E−09 |
| A15 | −4.5558196E−09 | −8.5566158E−09 | −4.2543878E−07 | −4.0151490E−11 |
| A16 | −1.6349449E−12 | 1.2107243E−09 | 3.6109538E−08 | 3.8487625E−11 |

Table 28 shows values corresponding to Conditional Expressions (1) to (14) of the imaging lenses of Examples 1 to 9. It should be noted that, in the above-mentioned examples, the d line is set as the reference wavelength, and the values shown in the following Table 28 are values at the reference wavelength.

TABLE 28

| EXPRESSION NUMBER | CONDITIONAL EXPRESSION | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|
| (1) | (L1f + L1r)/(L1f − L1r) | 0.289 | 0.284 | 0.551 | 0.260 | 0.534 | 0.342 | 0.500 | 0.547 | 0.407 |
| (2) | THsum/LL | 0.766 | 0.806 | 0.680 | 0.769 | 0.745 | 0.808 | 0.730 | 0.660 | 0.674 |
| (3) | f3/f2 | 0.314 | 0.482 | 0.492 | 0.447 | 0.359 | 0.459 | 0.548 | 0.562 | 0.471 |
| (4) | (L3f + L3r)/(L3f − L3r) | −0.083 | 0.000 | 0.000 | −0.137 | −0.123 | 0.000 | 0.002 | 0.000 | 0.000 |
| (5) | L2r/L2f | −0.377 | 0.000 | 0.000 | −3.637 | −7.032 | 0.000 | 0.000 | 0.000 | 0.009 |
| (6) | f/f1 | −0.983 | −1.015 | −0.786 | −1.054 | −0.955 | −1.001 | −0.963 | −0.892 | −0.772 |
| (7) | TTL/f | 3.260 | 3.144 | 3.754 | 3.140 | 3.590 | 3.298 | 3.393 | 3.682 | 3.755 |
| (8) | LL/f | 2.614 | 2.550 | 3.166 | 2.516 | 3.021 | 2.663 | 2.804 | 3.046 | 3.163 |
| (9) | f × Σϕp | 0.028 | 0.173 | 0.153 | −0.062 | −0.125 | 0.157 | 0.149 | 0.256 | 0.116 |
| (10) | f/f2 | 0.309 | 0.431 | 0.391 | 0.387 | 0.300 | 0.406 | 0.488 | 0.428 | 0.384 |
| (11) | f/f3 | 0.985 | 0.894 | 0.795 | 0.866 | 0.835 | 0.886 | 0.890 | 0.762 | 0.815 |
| (12) | f/f4 | −0.575 | −0.578 | −0.740 | −0.467 | −0.436 | −0.570 | −0.662 | −0.800 | −0.735 |
| (13) | f/f5 | 0.888 | 0.810 | 0.768 | 0.974 | 0.931 | 0.817 | 0.762 | 0.808 | 0.802 |
| (14) | f/f6 | −0.595 | −0.491 | −0.267 | −0.569 | −0.620 | −0.496 | −0.438 | −0.181 | −0.335 |

As can be seen from the above-mentioned data, all the imaging lenses of Examples 1 to 9 satisfy Conditional Expressions (1) to (14), and are imaging lenses each of which has an F number as small as 1.8 or less and in which various aberrations are satisfactorily corrected.

Figure 19:
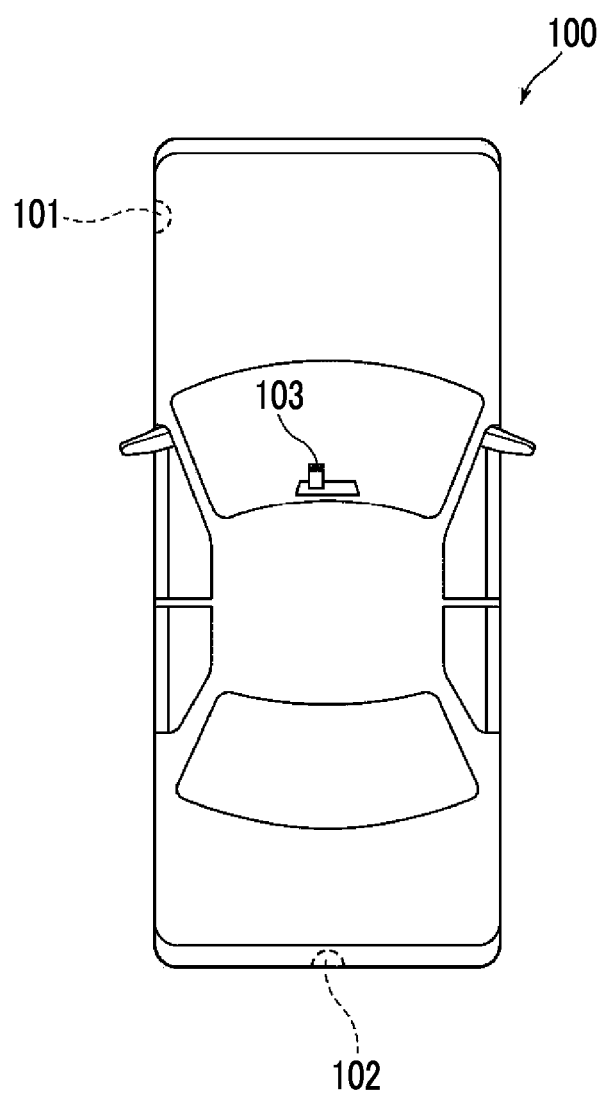
FIG. 19 is a diagram illustrating arrangement of an on-vehicle imaging apparatus according to an embodiment of the present invention.

Next, an example of use of an imaging apparatus according to an embodiment of the present invention will be described. FIG. 19 shows a state where the imaging apparatus comprising the imaging lens of the present embodiment is mounted on a vehicle 100 as an example of use. In FIG. 19, a vehicle 100 comprises: an outside-vehicle camera 101 that is for capturing an image of a blind area on a lateral side of a passenger seat; an outside-vehicle camera 102 that is for capturing an image of a blind area on a rear side of the vehicle 100; and an in-vehicle camera 103 which is mounted on the rear of the rearview mirror in order to capture an image in a range of field of view which is the same as that of a driver. The outside-vehicle camera 101, the outside-vehicle camera 102, and the in-vehicle camera 103 are imaging apparatuses according to the embodiment of the present invention, and each apparatus comprises the imaging lens according to the example of the present invention; and an imaging element that converts an optical image, which is formed through the imaging lens, into an electrical signal.

The imaging lenses according to the examples of the present invention have the above-mentioned advantages. Thus, the outside-vehicle cameras 101 and 102 and the in-vehicle camera 103 can be configured to have a small size and low costs, can be used even in dark places, and is capable of obtaining a favorable video with a high resolution.

The present invention has been hitherto described through embodiments and examples, but the present invention is not limited to the above-mentioned embodiments and examples, and may be modified into various forms. For example, values such as the radius of curvature, the surface spacing, the refractive index, the Abbe number, and the aspheric coefficients of each lens element are not limited to the values shown in the numerical examples, and different values may be used therefor.

In the embodiment of the imaging apparatus, the description was given with reference to the drawings illustrating an example in which the present invention is applied to the on-vehicle camera. However, the present invention is not limited to the applications, and may be applied to, for example, surveillance cameras, industrial cameras, digital cameras, and the like.

EXPLANATION OF REFERENCES wa: on-axis rays
wb: rays with maximum angle of view
100: vehicle
101, 102: outside-vehicle camera
103: in-vehicle camera
L1: first lens
L2: second lens
L3: third lens
L4: fourth lens
L5: fifth lens
L6: sixth lens
PP: optical member
Sim: image plane
St: aperture stop
Z: optical axis

What is claimed is:

1. An imaging lens comprising, in order from an object side:
a first lens that has a biconcave shape;
a second lens that is convex toward an image side and has a positive refractive power;
a third lens that has a biconvex shape;
a fourth lens that has a negative refractive power;
a fifth lens that has a positive refractive power; and
a sixth lens that has a negative refractive power,
wherein the following conditional expression is satisfied, $$0.1<(L1f+L1r)/(L1f-L1r)<0.8 \qquad (1),$$

where L1f is a paraxial radius of curvature of an object side surface of the first lens, and
L1r is a paraxial radius of curvature of an image side surface of the first lens.

2. The imaging lens according to claim 1, wherein the following conditional expression is satisfied, $$0.55<THsum/LL<0.9 \qquad (2),$$

where THsum is a sum of center thicknesses of the lenses of the whole system, and
LL is a distance on an optical axis from the object side surface of the first lens to an image side surface of the sixth lens.

3. The imaging lens according to claim 1, wherein the following conditional expression is satisfied, $$0.1<f3/f2<0.8 \qquad (3),$$

where f2 is a focal length of the second lens, and
f3 is a focal length of the third lens.

4. The imaging lens according to claim 1, wherein the following conditional expression is satisfied, $$-0.2<(L3f+L3r)/(L3f-L3r)<0.1 \qquad (4),$$

where L3f is a paraxial radius of curvature of an object side surface of the third lens, and L3r is a paraxial radius of curvature of an image side surface of the third lens.

5. The imaging lens according to claim 1, wherein the following conditional expression is satisfied, $$-20<L2r/L2f<0.5 \qquad (5),$$

where L2f is a paraxial radius of curvature of an object side surface of the second lens, and
L2r is a paraxial radius of curvature of an image side surface of the second lens.

6. The imaging lens according to claim 1, wherein the following conditional expression is satisfied, $$-2<f/f1<-0.6 \qquad (6),$$

where f is a focal length of the whole system, and
f1 is a focal length of the first lens.

7. The imaging lens according to claim 1, wherein the following conditional expression is satisfied, $$2<TTL/f<5 \qquad (7),$$

where TTL is a distance on the optical axis from the object side surface of the first lens to a focal point on the image side in a case where a back focal length is set as an air conversion length, and
f is a focal length of the whole system.

8. The imaging lens according to claim 1, wherein the following conditional expression is satisfied, $$1.5<LL/f<4 \qquad (8),$$

where LL is a distance on the optical axis from the object side surface of the first lens to the image side surface of the sixth lens, and
f is a focal length of the whole system.

9. The imaging lens according to claim 1,
wherein a material of a plurality of lenses among the first to sixth lenses is resin, and
wherein the following conditional expression is satisfied, $$-0.2<f\times\Sigma\Phi p<0.35 \qquad (9),$$

where f is a focal length of the whole system, and
$\Sigma\Phi p$ is a sum of refractive powers as an inverse of a focal length of all the lenses of which materials are resin.

10. The imaging lens according to claim 1, wherein an aperture stop is disposed between the image side surface of the second lens and the image side surface of the third lens.

11. The imaging lens according to claim 1, wherein the following conditional expression is satisfied.

$$0.2<(L1f+L1r)/(L1f-L1r)<0.65 \qquad (1\text{-}1)$$

12. The imaging lens according to claim 1, wherein the following conditional expression is satisfied, $$0.6<THsum/LL<0.85 \qquad (2\text{-}1),$$

where THsum is a sum of center thicknesses of the lenses of the whole system, and
LL is a distance on the optical axis from the object side surface of the first lens to the image side surface of the sixth lens.

13. The imaging lens according to claim 1, wherein the following conditional expression is satisfied, $$0.2<f3/f2<0.65 \qquad (3\text{-}1),$$

where f2 is a focal length of the second lens, and
f3 is a focal length of the third lens.

14. The imaging lens according to claim 1, wherein the following conditional expression is satisfied, $$-0.17<(L3f+L3r)/(L3f-L3r)<0.05 \qquad (4\text{-}1),$$

where L3f is a paraxial radius of curvature of the object side surface of the third lens, and
L3r is a paraxial radius of curvature of the image side surface of the third lens.

15. The imaging lens according to claim 1, wherein the following conditional expression is satisfied, $$-10 < L2r/L2f < 0.1 \qquad (5\text{-}1),$$

where L2f is a paraxial radius of curvature of the object side surface of the second lens, and
L2r is a paraxial radius of curvature of the image side surface of the second lens.

16. The imaging lens according to claim 1, wherein the following conditional expression is satisfied, $$-1.5 < f/f1 < -0.7 \qquad (6\text{-}1),$$

where f is a focal length of the whole system, and
f1 is a focal length of the first lens.

17. The imaging lens according to claim 1, wherein the following conditional expression is satisfied, $$2.5 < TTL/f < 0.5 \qquad (7\text{-}1),$$

where TTL is a distance on the optical axis from the object side surface of the first lens to the focal point on the image side in a case where a back focal length is set as an air conversion length, and
f is a focal length of the whole system.

18. The imaging lens according to claim 1, wherein the following conditional expression is satisfied, $$2 < LL/f < 3.5 \qquad (8\text{-}1),$$

where LL is a distance on the optical axis from the object side surface of the first lens to the image side surface of the sixth lens, and
f is a focal length of the whole system.

19. The imaging lens according to claim 1,
wherein a material of a plurality of lenses among the first to sixth lenses is resin, and
wherein the following conditional expression is satisfied, $$-0.15 < f \times \Sigma\Phi p < 0.3 \qquad (9\text{-}1),$$

where f is a focal length of the whole system, and
$\Sigma\Phi p$ is a sum of refractive powers as an inverse of a focal length of all the lenses of which materials are resin.

20. An imaging apparatus comprising the imaging lens according to claim 1.

* * * * *